(12) United States Patent
Quidant et al.

(10) Patent No.: US 11,420,264 B2
(45) Date of Patent: Aug. 23, 2022

(54) METHOD AND A SYSTEM FOR PRODUCING A THREE-DIMENSIONAL OBJECT

(71) Applicants: Fundació Institut de Ciències Fotòniques, Castelldefels (ES); Institució Catalana de Recerca i Estudis Avançats, Barcelona (ES)

(72) Inventors: Romain Quidant, Castelldefels (ES); Gerasimos Konstantatos, Castelldefels (ES); Alexander Powell, Castelldefels (ES); Alexandros Stavrinadis, Castelldefels (ES); Jianjun Wang, Castelldefels (ES)

(73) Assignees: FUNDACIÓ INSTITUT DE CIÈNCIES FOTÔNIQUES, Castelidefels (ES); INSTITUCIÓ CATALANA DE RECERCA I ESTUDIS AVANAIS, Barcelona (ES)

( * ) Notice: Subject to any disclaimer, the term of this patent is extended or adjusted under 35 U.S.C. 154(b) by 373 days.

(21) Appl. No.: 16/604,504

(22) PCT Filed: Apr. 10, 2018

(86) PCT No.: PCT/EP2018/059185
§ 371 (c)(1),
(2) Date: Oct. 10, 2019

(87) PCT Pub. No.: WO2018/189190
PCT Pub. Date: Oct. 18, 2018

(65) Prior Publication Data
US 2020/0156152 A1     May 21, 2020

(30) Foreign Application Priority Data

Apr. 11, 2017 (EP) .................................. 17382197

(51) Int. Cl.
*B33Y 10/00* (2015.01)
*B33Y 30/00* (2015.01)
(Continued)

(52) U.S. Cl.
CPC ............ *B22F 12/00* (2021.01); *B29C 64/153* (2017.08); *B29C 64/165* (2017.08); *B33Y 10/00* (2014.12);
(Continued)

(58) Field of Classification Search
None
See application file for complete search history.

(56) References Cited

U.S. PATENT DOCUMENTS 8,062,738 B2   11/2011   Yoon et al.
8,535,036 B2   9/2013    Hopkinson et al.
(Continued)

FOREIGN PATENT DOCUMENTS

CN   106433130 B   2/2017
EP   1737646 B1    5/2007
(Continued)

OTHER PUBLICATIONS

Written Opinion and International Search Report corresponding to International Application No. PCT/EP2018/059185 dated Jun. 20, 2018.
(Continued)

*Primary Examiner* — Mary Lynn F Theisen
(74) *Attorney, Agent, or Firm* — Jenkins, Wilson, Taylor & Hunt, P.A.

(57) ABSTRACT

The present invention relates to a method for producing a 3D object and to a system adapted to implement the method, wherein the method comprises: —providing a powder material (G); —providing a radiation absorbent material, in the form of optically resonant particles (P), on a region to be
(Continued)

sintered of the powder material; and—sintering the region to be sintered of the powder material (G), by exposing to light the optically resonant particles (P) to radiation. The method comprises providing the optically resonant particles (P) according to a distribution and proportion, with respect to the powder material (G) included in the region to be sintered, selected: —to disperse the optically resonant particles (P) within the powder material (G) included in said region, and—to avoid substantial agglomeration and substantial self-sintering of the optically resonant particles (P).

20 Claims, 8 Drawing Sheets

(51) Int. Cl.
*B29C 64/153* (2017.01)
*B29C 64/165* (2017.01)
*B22F 12/00* (2021.01)
*B33Y 70/00* (2020.01)
*B22F 10/10* (2021.01)

(52) U.S. Cl.
CPC ............... *B33Y 30/00* (2014.12); *B33Y 70/00* (2014.12); *B22F 10/10* (2021.01)

(56) References Cited

U.S. PATENT DOCUMENTS

| | | |
|---|---|---|
| 9,505,058 B2 | 11/2016 | Wu et al. |
| 2009/0206520 A1 | 8/2009 | Park |
| 2016/0200011 A1 | 7/2016 | Rothfuss |
| 2018/0333914 A1* | 11/2018 | Rudisill ................ B22F 1/0022 |
| 2018/0354191 A1* | 12/2018 | Nauka ................... B29C 64/165 |

FOREIGN PATENT DOCUMENTS

| | | |
|---|---|---|
| EP | 1459871 B1 | 4/2011 |
| JP | 2004-190089 A | 7/2004 |
| JP | 2007-529340 A | 10/2007 |
| JP | 2015-218395 A | 12/2015 |
| WO | WO2016/053305 A1 | 4/2016 |
| WO | WO2016/068899 A1 | 5/2016 |

OTHER PUBLICATIONS

European Search Report and Opinion for European Patent Application Serial No. 2017328197.6 dated Nov. 9, 2017.
Office Action corresponding to Chinese Patent Application Serial No. 201880037426 dated Jun. 28, 2021.
Search Report corresponding to Japanese Patent Application Serial No. 2019-555578 dated Jan. 20, 2022.

* cited by examiner

METHOD AND A SYSTEM FOR PRODUCING A THREE-DIMENSIONAL OBJECT

FIELD OF THE INVENTION

The present invention relates, in a first aspect, to a method for producing a three-dimensional object, by sintering a powder material from heat generated by a radiation absorbent material, and more particularly to a method providing an enhanced sintering of the powder material.

A second aspect of the invention relates to a system adapted to implement the method of the first aspect.

The invention is particularly applied to the manufacturing of 3D objects using a layer-by-layer deposition process.

BACKGROUND OF THE INVENTION

The ability to rapidly produce an almost infinite variety of 3D objects with a single apparatus is poised to revolutionise manufacturing across a multitude of fields.

Powder bed technologies can produce objects via the layer-by-layer sintering or melting of powders via incident radiation to form 3D objects. The object is divided into a number of slices by a computer and the top layer of the powder bed is selectively sintered to form a solid version of a slice, before more powder is added and the next slice is formed.

One method for selecting the areas to be sintered is to scan the spot or focal point of a light source across the powder, which has a wavelength (or wavelengths) that is absorbed by the powder, causing it to heat, so sintering occurs beneath the path of the light source, but nowhere else. As many sintered materials such as polymers only absorb far into the infrared (IR) this often requires dangerous, expensive, high power light sources such as CO2 lasers. Powders mixed together with carbon black, or other materials such as carbon nanotubes, and graphene flakes and other 2D materials have all demonstrated sintering using much cheaper and less powerful lasers than for untreated powders, but this means that all components will be black or grey in colour, which is often undesirable. Additionally, additives such as carbon black have been shown to agglomerate significantly in some cases which can be detrimental to the material properties of the finished product.

Another method for selective sintering is the controlled deposition of a radiation absorbent material which absorbs incident radiation much more strongly than the powder, heats up, and therefore only causes sintering to occur where it has been deposited. The most common material in use is again carbon black powder, and so the potential colour gamut for a 3D printed object is vastly reduced.

Patents EP1737646B1, EP1459871B1, and U.S. Pat. No. 8,535,036B2 disclose some implementations of said method including the controlled deposition of a radiation absorbent material, such as carbon black or others, but none of them being an optically resonant material.

Said patent documents do not either disclose applying the radiation absorbent material such that no agglomeration thereof occurs. In fact, such an agglomeration is not even seen as a problem in said patent documents.

Use of the plasmonic resonance for sintering has been suggested in prior art, specifically in U.S. Pat. No. 9,505,058B2 and U.S. Pat. No. 8,062,738B2.

U.S. Pat. No. 9,505,058B2 discloses the use of plasmonic resonant particles for manufacturing an object by means of a 3D printing process, particularly metallic nanoparticles (MNP) coated with a stabilizing material. In said patent, the sintering process consists in sintering the stabilized metallic nanoparticles to each other.

Hence, U.S. Pat. No. 9,505,058B2 teaches away from avoiding the sintering of the plasmonic resonant particles.

The use of plasmonic resonant particles to sinter an underlying material layer is disclosed in U.S. Pat. No. 8,062,738B2, although in this case the underlying material layer is not a powder material but a target non-powder object (such as a TiO2 layer of a photovoltaic cell) and thus the plasmonic resonant particles are not dispersed therein but applied on a film over said target non-powder object (directly or through an intermediate layer), and are then easily removed after sintering, for example by etching.

The dispersion of nanoparticles (NP) within the powder to be sintered has not been described, nor has the ability to tune the resonance of these nanoparticles so that it does not impact the colour of the powder. All previous descriptions either aim for a very dense matrix of nanoparticles to allow them to sinter to each other (U.S. Pat. No. 9,505,058B2), or are indifferent to nanoparticle dispersion and NP-NP agglomeration or sintering (U.S. Pat. No. 8,062,738B2). To sinter non-metal powders, this is vital, as NP-NP agglomeration and/or sintering has been shown to damage the plasmon resonance and therefore reduce heating (See FIGS. 2a, 2b and FIG. 3), can spoil or alter the colour of the sintered powder material (made of, for example, a polymeric material) and can be detrimental to the mechanical properties of the final product, and also to the heating properties and the optical properties of the NP's. It is actually energetically favourable for NP's to sinter to each other, as this facilitates the reduction of the surface energy of the metal.

US 2016/200011 A1 discloses a method for producing a three-dimensional object, comprising:
  providing a powder material;
  providing a radiation absorbent material at least on a region to be sintered of said powder material, wherein the method comprises providing, as said radiation absorbent material, optically resonant particles; and
  sintering said region to be sintered of the powder material, by exposing said radiation absorbent material to radiation that causes the optically resonant particles to optically resonate to heat up and transfer heat to the powder material, wherein said radiation is light.

It is, therefore, necessary to provide an alternative to the state of the art which covers the gaps found therein, by providing a method and a system for producing a 3D object by sintering powder material with heat generated from radiation absorbent material, which do not possess the above mentioned drawbacks of the existing proposals, thus providing an enhanced and low energy sintering of the powder material.

SUMMARY OF THE INVENTION

To that end, the present invention relates, in a first aspect, to a method for producing a three-dimensional object, comprising, in a known manner:
  providing a powder material;
  providing a radiation absorbent material at least on a region to be sintered of said powder material, wherein the method comprises providing, as said radiation absorbent material, optically resonant particles; and
  sintering said region to be sintered of the powder material, by exposing said radiation absorbent material to radiation that causes the optically resonant particles to optically resonate to heat up and transfer heat to the powder material, wherein said radiation is light.

In the present document, the term "light" refers to an electromagnetic radiation covering the part of the electromagnetic spectrum going from 200 nm up to 20 um, i.e. visible light (from 300/400 nm to 700 nm) and non-visible light.

In contrast to the methods known in the prior art, the one of the first aspect of the present invention comprises, in a characterizing manner, providing the optically resonant particles according to the following parameters: distribution and proportion of the optically resonant particles, with respect to the powder material included in said region to be sintered, wherein the method comprises selecting said parameters:
- to disperse the optically resonant particles within the powder material included in said region, and
- to avoid substantial agglomeration and substantial self-sintering of the optically resonant particles, even during sintering of the powder material.

In the present document the terms "self-sintering" refer to a form of aggregation of the optically resonant particles, which in the context of the present invention is brought about by heating. In this document, this term only refers to the optically resonant particles, as they are the heat sources due to the photothermal effect, and so the sintering of one to another upon heating can be described as self-induced. Conversely, the sintering of the powder particles of the powder material to each other is simply referred to as "sintering" in the present document.

This self-sintering may be very similar to mild aggregation, with the particles mechanically attached to one another in such a way that they will not separate on mechanical stirring, sonication, etc., but where they retain their original shape in a way that it could be observed in an electron microscope etc. On the other hand, it also includes cases where the particles have heated so much they melt into each other and become indistinguishable, the extreme case of which is the formation of a single particle made from the melting together of multiple particles. Such a substantial self-sintering is avoided by the present invention.

Preferably, the above mentioned dispersion is an even dispersion.

The optically resonant particles absorb significantly more of the incident radiation, and heat up considerably at a much greater rate than the powder material. They then transfer heat to the powder, facilitating sintering thereof.

To utilise optically resonant particles to improve the sintering efficiency of other powders, without substantial agglomeration and self-sintering is non-trivial, and care must be taken to avoid this, via consideration of parameters such as the ones stated above (distribution and proportion of the optically resonant particles), and, for some embodiments, the ones which will be indicated below.

An enhanced sintering of the powder material is achieved by the present invention, as thanks to the substantial non-agglomeration and non-self-sintering of the optically resonant particles, their heating and optical properties are not adversely affected, not even when dispersed within the powder material, so that they operate at a maximum efficiency to sinter the powder material.

Moreover, by means of the present invention the material properties of the finished product, both optical and mechanical, are not either adversely affected by the optically resonant particles.

Said radiation to which the optically resonant particles are exposed is light generated from one or more light sources, such as a LED, a heated bar, an halogen source, a flash lamp, a laser (with single wavelength or with a plurality of wavelengths), other broadband or narrowband sources of ultraviolet (UV) light, visible or infrared electromagnetic radiation. The wavelength of the source can be tuned to match the resonance of the optically resonant particles or could be detuned from this resonance.

For some embodiments, the method of the first aspect of the invention comprises tuning the optically resonant particles so that their strongest resonant peak and/or if non, or multiply resonant, the greatest portion of their output or absorption spectra is in the 180 nm to 5000 nm spectral range, preferably in the 400 nm to 3000 nm spectral range, and more preferably in the 440 nm to 2500 nm spectral range, and wherein the radiation to which the radiation absorbent material is exposed is light at least at a wavelength included in at least one of said spectral ranges.

Alternately, an electron beam can be used to excite the resonance of the particles.

Although, for an embodiment the method of the first aspect of the present invention is intended to produce a 3D object comprising only one layer (or slice) of a sintered powder material (having a thickness above the atomic scale, i.e. being a 3D layer), such as a flexible sheet, for a preferred embodiment the method comprises producing a 3D object using a layer-by-layer deposition process, by applying at least a further powder material over the already sintered powder material, which forms a base layer, and then sintering a region of said further powder material as explained above regarding the base layer, i.e. also by providing thereon optically resonant particles according to the above mentioned selected parameters, and exposing to light radiation the optically resonant particles provided on the further powder layer.

Additional powder layers can be provided and sintered over the already sintered and stacked layers, such that a final 3D product is obtained formed by a plurality of selectively sintered regions having the same or different cross-sections.

In the present document, the terms "substantial agglomeration" and "substantial self-sintering" are used to define the case where a large enough fraction of the optically resonant particles present dispersed in the powder material have agglomerated so that it causes a substantial spectral change which will be detrimental to either the heating properties and/or the optical properties of the optically resonant particles.

Therefore, said substantial agglomeration and substantial self-sintering can be defined using the absorption spectra of the optically resonant particles, whether they are in a solution, on a planar surface, or in a sintered object, where the optically resonant particles may or may not have been used to initiate sintering.

Substantial agglomeration and substantial self-sintering refer to an agglomeration and self-sintering which causes a change in the absorption spectra of the optically resonant particles in the form of at least one shift in one or more optical resonance peaks above or equal to five times the full-width at half maximum (FWHM) and/or at least a broadening of one or more optical resonance peaks above or equal to five times the FWHM. Here the initial FWHM is defined from measurements of the optically resonant particles before being dispersed in the powder material, and for example coated in an appropriate anti-agglomeration layer in a well-dispersed solution.

For an embodiment associated to a given shape and material of optically resonant particles in a given powder material, said substantial agglomeration and substantial self-sintering refers to an agglomeration and self-sintering which causes a change in the absorption spectra of the optically resonant particles in the form of at least one shift in one or more optical resonance peaks above or equal to three times the full-width at half maximum (FWHM) and/or at least a broadening of one or more optical resonance peaks above or equal to three times the FWHM.

For another embodiment associated to another given shape and material of optically resonant particles in a given powder material, said substantial agglomeration and substantial self-sintering refers to an agglomeration and self-sintering which causes a change in the absorption spectra of the optically resonant particles in the form of at least one shift in one or more optical resonance peaks above or equal to two times the full-width at half maximum (FWHM) and/or at least a broadening of one or more optical resonance peaks above or equal to two times the FWHM.

For a further embodiment associated to a further given shape and material of optically resonant particles in a given powder material, said substantial agglomeration and substantial self-sintering refers to an agglomeration and self-sintering which causes a change in the absorption spectra of the optically resonant particles in the form of at least one shift in one or more optical resonance peaks above or equal to 1.5 times the full-width at half maximum (FWHM) and/or at least a broadening of one or more optical resonance peaks above or equal to two times the FWHM.

Regarding the optically resonant particles, depending on the embodiment, they include one or more of the following different types of particles: plasmonic resonant particles, Mie resonant particles, or a combination thereof.

With respect to the size of the optically resonant particles, they have an average cross-sectional length that is from 1 nm up to 5 µm, depending on the embodiment, to be adapted to the requested application, and also to provide the desired tuning of the optical properties of the optically resonant particles.

According to an embodiment, particularly when the optically resonant particles are not small enough (for example, for nanoparticles made of some metals with an average cross-sectional length above 15 nm), the method of the first aspect of the present invention further comprises providing an anti-agglomeration coating on the optically resonant particles, wherein said anti-agglomeration coating is configured to cooperate in the above mentioned avoiding of substantial agglomeration and substantial self-sintering of the optically resonant particles, before being provided on said region to be sintered, while being provided and once already provided, at least by tailoring the surface chemistry of the optically resonant particles.

For some embodiments, said anti-agglomeration coating is between 0.1-50 nm thick.

Depending on the embodiment, the method of the invention comprises selecting said anti-agglomeration coating whether to maximize or to minimize thermal shape stability. In the first case, i.e. if thermal shape stability is maximized, the shape of the optically resonant particles does not substantially change at a temperature range relevant for the sintering, while in the second case, i.e. if thermal shape stability is minimized, the shape of the optically resonant particles substantially changes at a temperature range relevant for the sintering.

Also, depending on the embodiment, the method of the invention comprises selecting said anti-agglomeration coating whether to maximize or to minimize thermal chemical stability, both of the anti-agglomeration coating (such as ligands thereof) and of the surface of the optically resonant particles, such that the anti-agglomeration coating and the surface composition of the optically resonant particles may change or not during sintering, the anti-agglomeration coating may evaporate or not, may undergo chemical transformation (e.g. oxidized, pyrolized) or not, may further react with the atoms on other atoms located on the surface of the material or not, and may or may not be present at the end of the sintering process.

In other words, depending on the embodiment, the anti-agglomeration coating is designed to decay during the sintering process, or may be removed by chemical treatment at any later point in the process. Alternately, the anti-agglomeration coating may be designed to withstand all the thermal, optical and chemical stresses in the preparation and sintering process, and to stay intact around the radiation absorbent particle in the sintered material.

The anti-agglomeration coating is selected, also depending on the embodiment, to cooperate in the above mentioned avoiding of substantial agglomeration and substantial self-sintering of the optically resonant particles, by providing at least one of the following effects: steric effects, hydrophobicity, surface stabilization, electrostatic repulsion, etc.

According to an embodiment of the method of the first aspect of the present invention, the above mentioned step of providing the optically resonant particles at least on a region to be sintered of the powder material, comprises providing them in a dry form. In this case, preferably, the mass fraction of the optically resonant particles to the powder should not exceed 30%.

For an alternative embodiment, the step of providing the optically resonant particles at least on a region to be sintered of the powder material, comprises providing them in a liquid or solution, wherein the liquid or solution, and the concentration of optically resonant particles are chosen to cooperate in the above mentioned avoiding of substantial agglomeration and substantial self-sintering of the optically resonant particles.

For an embodiment, the liquid or solution with the optically resonant particles is provided over a bed or layer formed by the powder material, for example by spraying across the entire powder bed, or selectively through a mask, or selectively via the motion of the powder bed or a spray nozzle, such that the optically resonant particles are dispersed as a spray above the powder bed. The spray nozzle may take the form of an inkjet print head, an atomiser or any other form of liquid dispersant.

For another embodiment, the optically resonant particles are dispersed in a liquid above the powder bed. Multiple dispersant heads could be used for some implementations of said embodiment, containing the optically resonant particles plus different coloured dyes to allow for colour 3D printing.

Alternatively, the powder material is added to the liquid or solution containing the optically resonant particles, for a period of time sufficient for the optically resonant particles to adsorb onto the surface of the powder, but are dispersed well enough so that significant or substantial agglomeration or self-sintering does not occur. The liquid is then dried leaving a powder mixed with the optically resonant particles ready to be sintered.

For some types of optically resonant particles, the concentration of the optically resonant particles in the liquid or solution should not exceed 100 g/L, or 10% of the mass fraction of the liquid particle mix, to avoid agglomeration and self-sintering of the optically resonant particles to each other.

However, preferably, for other types of optically resonant particles, the concentration of the optically resonant particles in the liquid or solution should not exceed 300 g/L, or 30% of the mass fraction of the liquid particle mix, to avoid agglomeration and self-sintering of the optically resonant particles to each other.

The method of the present invention comprises, for an embodiment, selecting said liquid or solution, and/or additives added thereto according to its wetting abilities on the powder material, to control both the above mentioned dispersion of the optically resonant particles within the powder material and the avoiding of substantial agglomeration and substantial self-sintering of the optically resonant particles.

For a variant of said embodiment, the liquid or solution containing the optically resonant particles is chosen to maximise wetting to the powder material. This will enable the better penetration of the solvent into the gaps between the powder particles or grains and therefore a better dispersion of the optically resonant particles and reduce the risk of agglomeration and self-sintering. The liquid or solution could be a single chemical, a mix of liquids, or a single liquid or mix of liquids with other chemicals dissolved within it to effect its wetting properties.

For an alternative variant of said embodiment, the liquid or solution containing the optically resonant particles is chosen to minimise the wetting to the powder material. This will enable the selectivity of placement of the optically resonant particles in the edges and powder grain boundaries in the final sintered material. The liquid or solution could be a single chemical, a mix of liquids, or a single liquid or mix of liquids with other chemicals dissolved within it to effect its wetting properties.

For another embodiment, the liquid or solution containing the optically resonant particles is chosen to select the wetting to the powder material in a way which neither minimises nor maximises the wetting properties, but is at least partially defined by some other factor, (e.g. heat capacity, latent heat of evaporation, cost, toxicity, etc.). This will still enable a good dispersion of the optically resonant particles in the powder material but will also balance with other factors.

The step of providing the optically resonant particles at least on a region of the powder material, is performed, according to an embodiment, by selectively depositing the optically resonant particles on one or more regions to be sintered of the powder material, and the sintering step is performed by exposing to radiation the powder material and the optically resonant particles deposited on said one or more regions to be sintered thereof. Said radiation exposure can be performed simultaneously over the whole bed formed by the powder material and the optically resonant particles, or along different portions thereof, for example by sweeping a light beam across said bed.

Alternatively, the step of providing the optically resonant particles at least on a region to be sintered of the powder material, is performed non-selectively on the whole powder material, and the sintering step is performed by selectively exposing to radiation the powder material and the optically resonant particles provided on the one or more regions to be sintered thereof.

Said non-selective provision of the optically resonant particles on the whole powder material can be performed in different ways, depending on the embodiment, some of which are described below:
- by mixing the optically resonant particles with all of the already provided powder material;
- by mixing the optically resonant particles with a non-solid (for example, molten) or dissolved material, solidifying/drying the mixture and then turn the solidified/dried mixture into a powder form to produce mixture powder material including both the optically resonant particles and the powder material to be sintered; or
- by depositing the optically resonant particles on all of the already provided powder material.

For an embodiment, the optically resonant particles are pre-mixed together with the powder in a dried form, and the resultant mix should be such that there is no significant agglomeration or sintering of the optically resonant particles to each other, and so the mass fraction of optically resonant particles should be, preferably, less than 30%.

For another embodiment, the optically resonant particles are pre-mixed together with the powder, either in a liquid or deposited as a powder themselves, and heat (or submitted to excitation radiation) is applied so that the optically resonant particles are able to enter the surface of the powder particles, but not so that any sintering occurs. This would result in powder particles with optically resonant particles embedded near their surface. The resultant mix should be such that there is no significant agglomeration or sintering of the optically resonant particles to each other, and so the mass fraction should be, preferably, less than 30%.

According to an embodiment of the method of the first aspect of the present invention, a dye, pigment or any other colorant is added to the powder material before sintering, either with the radiation resonance particles in a solution or powder form, which is then applied to the powder to be sintered, or is pre-mixed in with the powder to be sintered, or is added to the powder material before in an earlier form and then made in to a coloured powder. Therefore, the final 3D product would not be white, and could be any range of colours, potentially multiple colours in the same product.

For an embodiment, in order to produce a three-dimensional object with a colour which is substantially the same as the colour of the powder material or of an added colour pigment, the method of the first aspect of the present invention comprises tuning the optically resonant particles so that their principal resonance is outside the visible spectrum, wherein said radiation to which the radiation absorbent material is exposed is light outside the visible spectrum.

For an implementation of said embodiment, the optically resonant particles are tuned to absorb almost exclusively in the IR (Infrared), making it transparent in the visible, so selective sintering can be achieved without significant alteration of the colour of the sintered object. Hence, by using IR light to excite the optically resonant particles, a selective, low energy sintering is achieved without significant alteration of the colour of the sintered object.

For another embodiment, also in order to produce a three-dimensional object with a colour which is substantially the same as the colour of the powder material (not white) or of an added colour pigment, the method of the first aspect of the present invention comprises tuning the optically resonant particles so that their principal resonance is within the visible spectrum and associated to a wavelength which matches or overlaps an absorption wavelength of the powder material or of an added colour pigment, wherein the radiation to which the radiation absorbent material is exposed is light which includes said wavelength.

For an alternative embodiment, in order to produce a three-dimensional object with a colour which is different from the colour of the powder material or of an added colour pigment, the method of the present invention comprises tuning the optically resonant particles so that their resonance is within the visible spectrum and associated to a wavelength which does not either match nor overlap an absorption wavelength of the powder material or of an added colour pigment, wherein the radiation to which the radiation absorbent material is exposed is light which includes said wavelength.

Different implementations of said alternative embodiment are described below:

coloured (in the visible) optically resonant particles with a particular colour and without including additional colour pigment, in order to absorb said particular colour and reflect the rest of colours, and hence colour the produced object with said rest of colours.

coloured (in the visible) optically resonant particles with a first colour and including a colour pigment of a second colour which is different from said first colour, so that colours which are not either said first and said second colours are absorbed by the optically resonant particles, and the first and second colours are reflected thereon.

For an embodiment, the method of the first aspect of the present invention further comprises a pre-heating step for pre-heating at least the regions of powder material to be sintered up to a pre-heating temperature at which no sintering is yet caused, and then performing a heating step comprising providing an increase of said pre-heating temperature up to a sintering temperature, by means of the heat transferred from the radiation absorbent particles, such that the sintering of said regions is provided.

For an implementation of said embodiment, both the pre-heating step and the heating step are performed by means of the heat transferred from the resonant absorbent particles. This implementation is particularly applicable (but not limited to) the case when the resonant absorbent particles are pre-mixed with the powder material, for which, then, both the resonant absorbent particles and the powder material absorb radiation.

For a variant of said implementation, the resonant absorbent particles are adapted to absorb at least a first and a second wavelengths, the method of the first aspect of the present invention comprising performing said pre-heating step by exposing the resonant absorbent particles to light having said first wavelength, and the heating step by exposing the same to light having said second wave-length.

Alternatively, the following types of pre-heatings for the powder material could be used:

Without using radiation (conductive heating).

Pre-heating with radiation absorbed by the polymer powder (usual way of preheating/state of the art).

Pre-heating with resonant nanoparticles at the same wavelength that the one used for sintering (for instance, first pre-heat with LED array and then sinter with laser).

Pre-heating with either a resonant absorbent particles that has two different resonant peaks, or two resonant absorbent particles each one with a particular resonant peak (1st radiate with wavelength 1 to heat, second radiate with wavelength 2 to sinter).

The inclusion and selection of the above mentioned parameters (distribution and proportion of the optically resonant particles, anti-agglomeration coating, liquid or solution, etc.), and values thereof, in different embodiments of the method of the first aspect of the present invention, is performed based on their individual and also synergic contribution to a global goal, i.e. that of dispersing the optically resonant particles within the powder material while avoiding substantial agglomeration and substantial self-sintering thereof. In other words, when, for example, for a particular application a certain concentration of radiation absorbent particles or the use of a certain solvent or class of solvents to mix with a given material are needed, which could increase agglomeration, other of said parameters are then tuned to reduce said agglomeration, such that the final agglomeration is below the above mentioned substantial agglomeration, therefore giving additional flexibility to the method of the present invention.

Depending on the embodiment, the powder material is a polymer, a ceramic, a semiconductor or a metal.

For an embodiment, the powder material is mixed in with a binder material, wherein the latter melts first on heating and binds the powder particles to each other, thus causing the sintering thereof.

The optically resonant particles are made of a metal material, a semiconductor material, an oxide semiconductor material, a dielectric material, or a combination thereof, depending on the embodiment.

Examples of materials for the metallic optically resonant particles are the following: Gold, Silver, Copper, Aluminium, Cobalt, chromium, Iron, Molybdenum, Manganese, nickel, palladium, platinum, rhodium, tantalum, titanium, tungsten or any other metal. Also including any blend or alloy of these metals, and/or an oxide or nitride of these metals.

Examples of such non-metal plasmonic particles can be chemical compounds of one or more metal elements with non-metal elements such as oxygen, or other kind of oxides, any of the chalcogenide elements (e.g. S, Se, Te), phosphor, phosphide, nitride, nitride salts of one of more metals, or combination of the above.

In these cases, for an embodiment, a plasmonic resonance is induced by heavy electronic doping of the optically resonant particles with an atomic or molecular dopant or by a deviation if the ideal stoichiometry of the optically resonant particle material. For example, in a semiconductive compound with a general formula of $AC_2$ particles where A is a metal (e.g. W, Mo, Cu, Ti, Zn, Sn) and C is non-metal (e.g. O, S, Se), heavy electronic doping can be caused by having an imperfect stoichiometry between A and C i.e. a case where the ratio between A and C is not 2. Another example is when the semiconductor compound has been doped with minute amounts (usually <10% of the total atomic stochiometry) of another element (or more than one elements) the addition of which results to the presence of free electrons in the conduction or the valence band of the material.

The following materials are examples of possible semiconductor or oxide semiconductor materials from which the optically resonant particles are made of for different embodiments: indium oxide doped with tin, zinc oxide doped with aluminium, zinc oxide doped with gallium, zinc oxide doped with antimony, iron oxide, indium gallium zinc oxide, zinc oxide, tin oxide, copper oxide, magnesium oxide, manganese oxide, titanium oxide, nickel oxide, indium oxide, gallium oxide, antimony oxide, bismuth oxide, aluminium oxide, $WO_{3-x}$, $MoO_{3-x}$, $MoS_2$, CuS, $Cu_{2-x}S$, $Cu_{2-x}Se$, $Cu_{2-x}Te$, GeTe, TiN, InN, $CuFeS_x$, $ReO_3$, and any combinations of all the above. Also including any blend or alloy of these metals chalcogenide, nitride and/or oxide.

The following materials are examples of possible dielectric materials from which the optically resonant particles are made of, for different embodiments: Silica, polystyrene, polymethylmethacrylate, polymethacrylate, polyamide, polyethylene, melamine resin, or any other polymer, glass, ceramic or other dielectric, including blends of more than one material and multi-layered or shelled structures containing layers with different materials or different blends or materials.

All of the above described types of metal plasmonic particles and of non-metal particles can be used for making the radiation absorbent particles used in the method of the first aspect of the present invention, for different embodiments, alone or combined with each other.

Regarding the geometries of the optically resonant particles, the following ones are some examples thereof for metallic particles: Spheres, spherical shells (a shell of metal with a dielectric, or semiconductor or metallic center), multiple shells, shells of any other 3D shape, cubes, rods, wires, pyramids, cages, crescents, cups, platelets of any 2D shape, tetrahedrons, or higher order 3D shape, any star-like or branched shapes, and any other particle geometry.

For semiconductor/oxide optically resonant particles, example of the geometries or crystal structures thereof are the following: Spheres, spherical shells (a shell of metal with a dielectric, or semiconductor or metallic centre), multiple shells, shells of any other 3D shape, cubes, rods, wires, pyramids, cages, crescents, cups, platelets of any 2D shape, tetrahedrons, or higher order 3D shape, any star-like or branched shapes, and/or their assemblies with crystalline or amorphous phase and any other particle geometry.

For an embodiment, the optically resonant particles are metallic, have an average cross-sectional length that is between 1 nm and 1 μm in size, and the resonance thereof is a plasmonic one, while for another embodiment the optically resonant particles are inorganic but non-metals, have an average cross-sectional length between 1 nm and 5 microns in size and the resonance thereof is a plasmonic one, or due to Mie effects or any other optical resonance.

Regarding the resonance or resonances of the optically resonant particles, their frequency/cies is/are tuned by controlling at least one of the following parameters: size, shape, material, blend or alloy proportions, coatings, or internal materials (e.g. for nanoshells, etc.) of the optically resonant particles, according to some embodiments.

Moreover, for the non-metallic optically resonant particles, the resonance can also be controlled, for some embodiments, by concentrations of dopants or alterations of the carrier density in the particles, or alterations to the crystal structure.

Moreover, depending on the embodiment, the optically resonant particles are monodisperse or have a range of properties in order to have a single or a range of resonances.

For an embodiment, the primary resonance will be tuned out of the optical spectrum into the infrared (IR) or the ultraviolet in order to not significantly affect the coloration of the powder of the sintered product.

With respect to the anti-agglomeration coating, the following are some possible examples of said coatings applied to metallic optically resonant particles, and which are adapted to the solvent on which the particles are intended to disperse:

Surfactants:
All cationic surfactants of the series "alkyl trimethyl ammonium" should work and give different stabilities. Cetyltrimethyl ammonium bromide (CTAB) or others alkyl trimethyl ammonium halides (lauryl trimethyl ... (DTAB), myristyl trimethyl (MTAB), etc. ... ). These surfactants interacts with the metallic surface due to electrostatic interactions. Polyethylene glycol (PEG), polyvinylpyrrolidone (PVP), Silica.

Protective Molecules Attached to the Surface of the Optically Resonant Particles:
Molecules containing thiol groups (R—SH) can be fixed to the gold and many other metals by coordination bonds. The dispersive properties of the molecule will be given by the R— moiety (polarity, hydrophilic-lipophilic balance, HLB) and can be very different and adapted to the solvent system you want to use:

For polar or aqueous solvents: —R can be an alcohol or polyol (—OH).

For middle polarity solvents (ethanol, acetone, other alcohols or ketones): —.R can be a polyethylene glycol of different molecular weights.

For highly non-polar solvents (e.g. toluene, methylene chloride, ethyl acetate, ethers, etc ... ): —R can be any alkyl chain. HS—(CH2) n-CH3 on which n may vary from 3 to 18.

Polymers:
Many polymers can be used to stabilize particles as they can interact with the surface. The dispersive properties of the particles will be then related to the solubility parameters of the polymer:

Polycationic polymers as polyvinylpyrrolidone, polyethylene imine, polyallyl amine, polylysine and co-polymers.

Polymers containing sulphur or thiol groups as polystyrene sulfonates, polysulfides, polysulfones and co-polymers.

Silica Shells:
Silica shells up to 50 nm thick can be prepared for most metal containing optically active nanoparticles.

These silica shells allow to disperse the optically resonant particles in most of the polar and non-polar solvents and protects substantially the nanoparticle structure.

The following are examples of possible anti-agglomeration coatings to be applied to semiconductor/oxide optically resonant particles: Cetyltrimethyl ammonium bromide (CTAB), Polyethylene glycol (PEG) and derivatives, polyvinylpyrrolidone (PVP), Silica, oleic acid, myristic acid, octanoic acid, steraic, any other organic cabroxylic acid, oleylamine, butylamine, any other organic amine, trioctylphosphine oxide, any other organic phosphine oxide, 1-octadecanethiol, dodecanethiol, any other organic thiol, 3-mercapopropionic acid, any other functionalized organic thiol, hydroxide, acetic ion, iodine ion, bromine ion, chlorium ion, sulfur ion, trioctylphosphine, any other organic phosphine, trioctylamine, Oleylamine, Triphenylphosphine, any analogues of the above and any combination of all of the above.

With respect to the solutions for the different types of optically resonant particles, the following are possible examples for the different types of materials from which the particles are made:

Solutions for Metallic Optically Resonant Particles:
Polar and non-polar solvents, such as water, alcohols, polyols, ketones, esters, ethers, aliphatic solvents, alkyl halides, benzene derivatives, or any polar or non-polar solvent compatible with the substrate to be treated.

Solutions for Semiconductor/Oxide Optically Resonant Particles:
Polar and non-polar solvents, such as Octyl ether, dioctyl ether, any other organic ethers, Chloroform, Toluene, hexane, octane, heptane and any other alkane, benzene, chlorobenze, dichlorobenze and any other chlorinated hydrocarbons, water, xylene, cyclohexane, mineral oil 280/310, mineral spirits 80/110, 100/140, acetone, methyl ethyl ketone, methyl isobutyl ketone, ethyl acetate, isopropyl acetate, n-propyl acetate, isobutyl acetate, methoxy propanol, ethoxy propanol, methanol, ethanol, iso-propanol, n-propanol, any other aliphatic and aromatic hydrocarbons, ketones, esters, ethers, glycol ethers, glycol ethyl esters, alcohols, dimethylformamide, Acetonitrile, N-methylpyrrolidone, any mixtures of the above.

Solutions for Dielectric Optically Resonant Particles:
Polar & Non-Polar Solvents.

It must be stated that for all of the above mentioned possible materials from which the optically resonant particles can be made, all types of solvents (both polar and non-polar) can be used, as the anti-agglomeration coating for the optically resonant particles can be designed to disperse almost in any kind of solvent.

The method of the first aspect of the present invention also comprises, for an embodiment, adding to the powder material a further particle or substance which confers additional properties to the 3D object, such as improved mechanical properties, magnetism, thermochromic behaviour, fluorescence, luminescence, etc.

For an alternative embodiments, the optically resonant particles themselves add new functionalities to the produced 3D object, such as thermochromicity, ferromagnetism, catalytic chemical behaviour, UV blocking, or radiation blocking (gamma, alpha, X-ray, etc.).

Further aspects of the invention, alternative to the above disclosed first aspect, differ from the first aspect in that the step of sintering the regions or regions of the powder material is substituted by a step of melting said region or regions, and/or in that the optically resonant particles are selected to avoid substantial self-bonding by melting, wherein the terms "substantial self-bonding" have the same or a similar meaning to the above defined terms "substantial agglomeration" and "substantial self-sintering".

A second aspect of the present invention relates to a system for producing a three-dimensional object, comprising:

at least one supplier device configured and arranged for providing:
 a powder material; and
 a radiation absorbent material at least on a region to be sintered of said powder material, wherein said radiation absorbent material is constituted by optically resonant particles;
and
 a controllable radiation source configured and arranged for exposing said radiation absorbent material to radiation that causes the optically resonant particles to optically resonate to heat up and transfer heat to the powder material, wherein said radiation is light, in order to sinter said region to be sintered of the powder material.

The system of the second aspect of the invention is adapted to implement the method of the first aspect, wherein said at least one supplier device is adapted to provide said optically resonant particles according to the following parameters: distribution and proportion of the optically resonant particles, with respect to the powder material included in the region to be sintered, selected:

to disperse the optically resonant particles within the powder material included in said region, and
to avoid substantial agglomeration and substantial self-sintering of the optically resonant particles, even during sintering of the powder material.

For an embodiment of the system of the second aspect of the invention, associated at least to the above mentioned embodiment of the method of the first aspect for which the optical resonant particles are mixed with a non-solid material to finally produce a mixture powder material, the system includes a common supplier device which provides said mixture powder material, i.e. provides simultaneously both the powder material and the radiation absorbent material.

On the other hand, for those embodiments of the method for which the powder material is first provided and the optical resonant particles are then provided thereon, advantageously at least two supplier devices are included in the system of the second aspect of the present invention, one for the powder material and another for the optical resonant particles (such as an inkjet print head).

For an embodiment, the system of the second aspect of the invention is a 3D printer which comprises also well-known features common to conventional 3D printers (such as movables carriages, ejection systems, actuation and driving mechanisms including electric motors, electric and electronic systems, etc.), which are not described herein in detail to avoid obscuring the present invention, but are incorporated herein by reference to said conventional 3D printers.

The system of the second aspect of the invention comprises, for an embodiment, a controller including a memory, program code residing in the memory, and a processor in communication with the memory and configured to execute the program code to generate control signals to apply to at least the controllable radiation source and to the at least one supplier device, to carry out the control of the operations thereof.

The present invention also relates, in a third aspect, to a computer program, comprising computer program components including code instructions that when executed on one or more processors of the controller of the system of the second aspect of the invention implement the above mentioned generation of control signals (in digital form, to be converted to electrical signals) to carry out the control of the operations of the controllable radiation source and of the at least one supplier device.

A fourth aspect of the present invention relates to a three-dimensional object, comprising a powder material including optically resonant particles dispersed within a sintered region of said powder material in a substantially non-agglomerated and substantially non-self-sintered form.

For an embodiment, the absorption spectra of the optically resonant particles dispersed within the powder material does not differ from the absorption spectra said optically resonant particles had before being dispersed within the powder material more than five times the FWHM, regarding at least one shift in one or more optical resonance peaks and/or regarding at least a broadening of one or more optical resonance peaks.

For another embodiment, the absorption spectra of the optically resonant particles dispersed within the powder material does not differ from the absorption spectra said optically resonant particles had before being dispersed within the powder material more than three times the FWHM, regarding at least one shift in one or more optical resonance peaks and/or regarding at least a broadening of one or more optical resonance peaks.

For another embodiment, the absorption spectra of the optically resonant particles dispersed within the powder material does not differ from the absorption spectra said optically resonant particles had before being dispersed within the powder material more than 1.5 times the FWHM, regarding at least one shift in one or more optical resonance peaks and/or regarding at least a broadening of one or more optical resonance peaks.

Preferably, the three-dimensional object of the fourth aspect of the present invention is produced according to the method of the first aspect of the invention.

A fifth aspect of the present invention relates to a material for use in the system of the second aspect of the invention, comprising a plurality of optical resonant particles defined as disclosed above for the method of the first aspect of the invention.

For an embodiment, the material of the fifth aspect of the invention also comprises the anti-agglomeration coating defined as disclosed above for the method of the first aspect of the invention.

For another embodiment, the material of the fifth aspect of the invention also comprises the liquid or solution defined as disclosed above for the method of the first aspect of the invention, with or without the anti-agglomeration coating.

For another embodiment, the material of the fifth aspect of the invention comprises a mixture powder material including both the optically resonant particles and the powder material to be sintered, as defined above for an embodiment of the method of the first aspect of the invention for which the optically resonant particles are mixed with a non-solid or dissolved material, the mixture is solidified/dried and then turned into the mixture powder material.

For an embodiment, said material is in the form of an ink for a 3D printing system.

A sixth aspect of the present invention relates to a package comprising, enclosed therein, the material of the fifth aspect of the invention.

For an embodiment, said package is an ink print cartridge and the material is in the form of an ink for a 3D printing system.

Said ink print cartridge comprises also well-known features common to conventional ink print cartridges (such as an ejection system electrically controlled to eject ink, including one or more ink nozzles and associated electric circuitry, etc.), which are not described herein in detail to avoid obscuring the present invention.

BRIEF DESCRIPTION OF THE FIGURES

In the following some preferred embodiments of the invention will be described with reference to the enclosed figures. They are provided only for illustration purposes without however limiting the scope of the invention.

DESCRIPTION OF THE PREFERRED EMBODIMENTS

Figure 1:
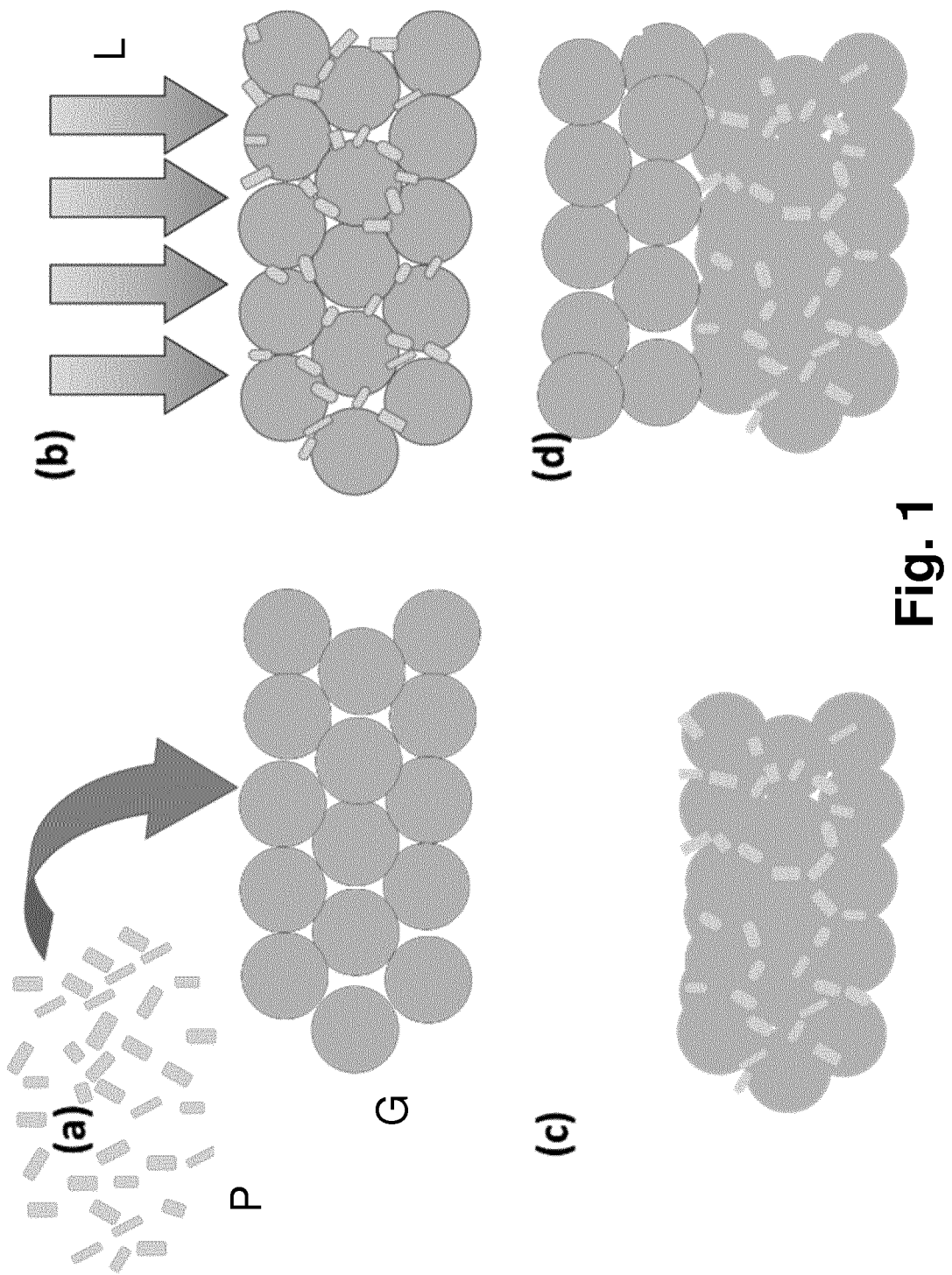
FIG. 1 schematically illustrates the method of the first aspect of the invention, for an embodiment.

The method of the first aspect of the present invention is schematically depicted in FIG. 1, for an embodiment applied to the manufacturing of a 3D object using a layer-by-layer deposition process, wherein the method comprises:

providing a powder material G in this case in the form of a powder bed, and adding a dispersion of optically resonant particles P to the powder G, as shown in FIG. 1(a), so that they are dispersed with minimal agglomeration penetrating at least part of the thickness of the powder bed, as shown in FIG. 1(b);

exposing the powder G and particles P to light L, as shown in FIG. 1(b), so that particles P optically resonate and heat up;

as shown in FIG. 1(c), the heat causes the powder particles G to sinter together, binding the optically resonant particles P inside. The optically resonant particles P do not sinter to one another significantly; and as shown in FIG. 1(d), a new layer of powder G is added and the process repeated (note that each powder layer could be premixed with optically resonant particles P or they could be added after deposition but before radiation). The addition of the optically resonant particles P has no effect on the colour of the sintered material when they are tuned so that their resonance is out of the visible spectrum or within the visible spectrum but associated to a wavelength which matches or overlaps an absorption wavelength of the powder material G or of an added colour pigment.

Some experiments have been performed by the present inventors to show the goodness of the present invention. Results of said experiments are shown in FIGS. 2 and 3.

Figure 2A:
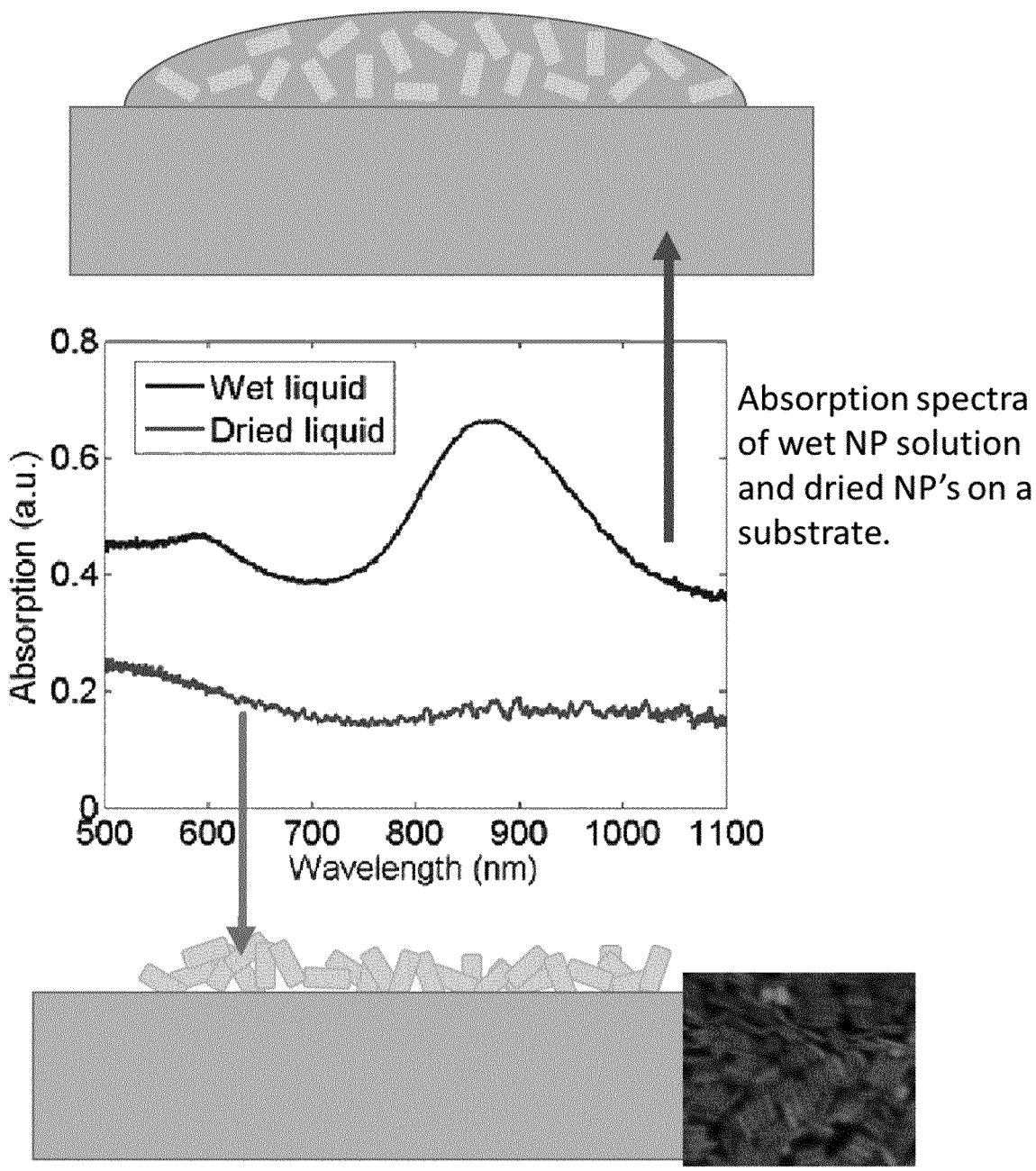
FIGS. 2a and 2b schematically show the effect of drying and heating on the absorption spectra of gold nanorods when applied over a flat surface (a), and also when dispersed within a powder material (b) according to an embodiment of the method of the first aspect of the invention.
Figure 2B:
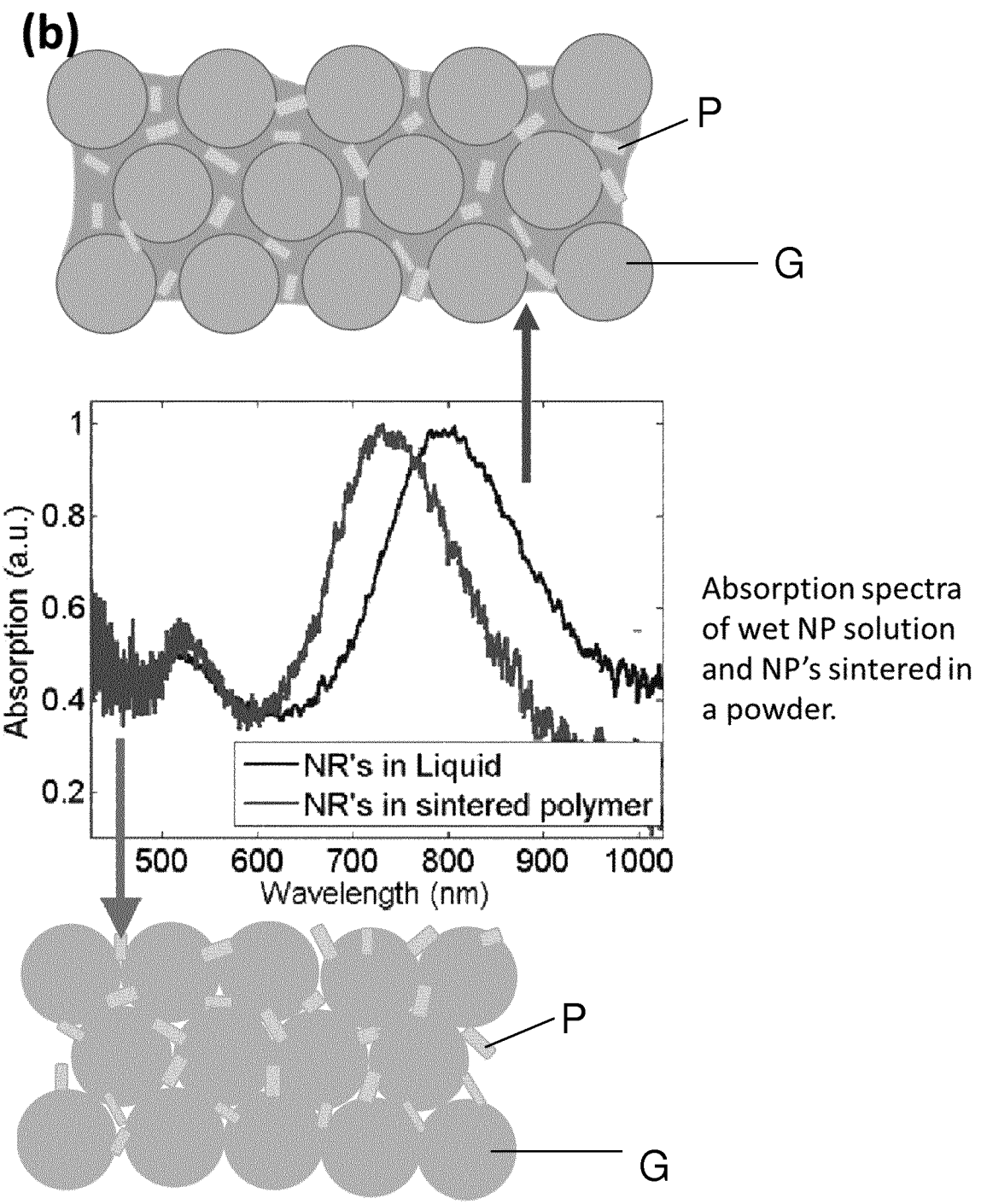
Figure 3:
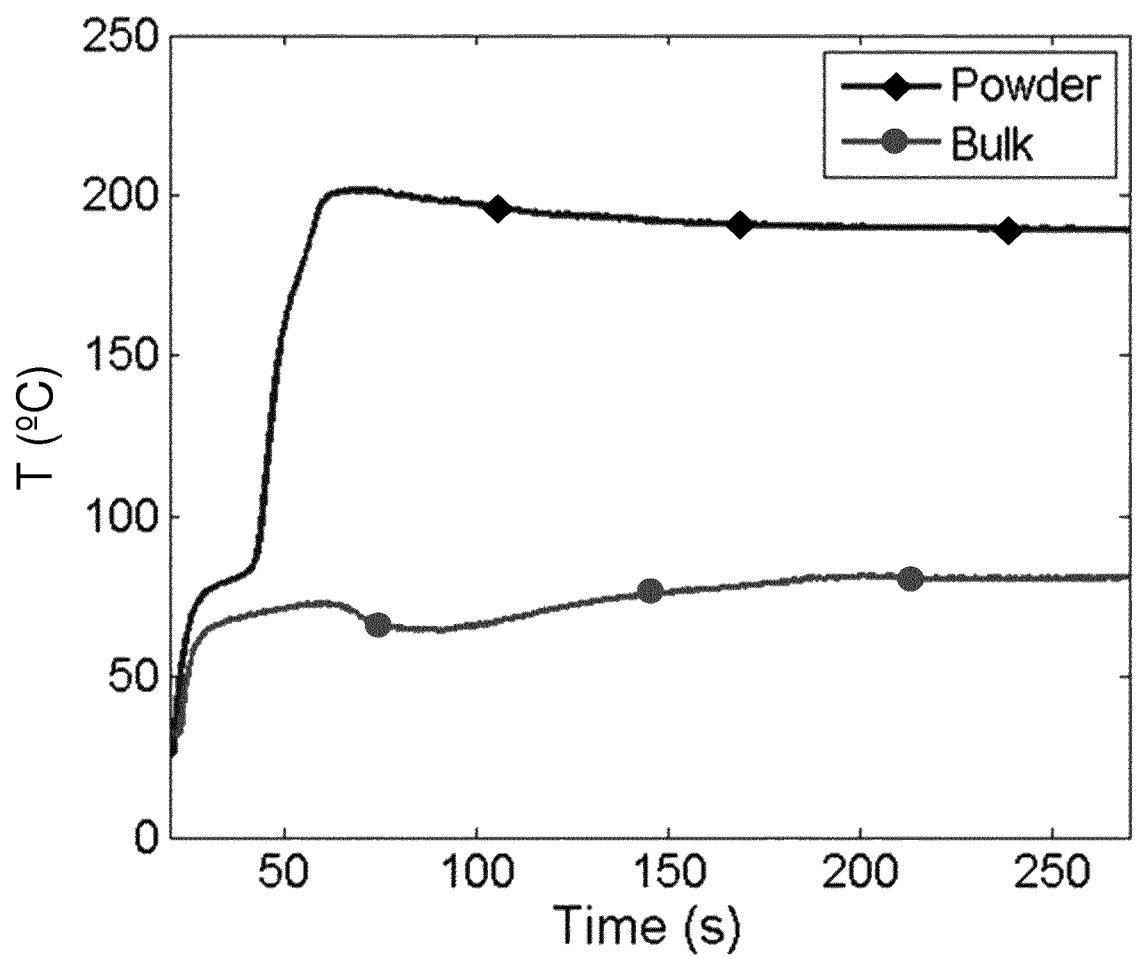
FIG. 3 is a plot showing the heating over time from 10 microliters of 0.1 g/L nanoparticles solution in powder (top graph), according to an embodiment of the method of the present invention, and on flat surface (bottom graph) under 3.5 W/cm$^2$, 808 nm laser illumination.

Particularly, FIGS. 2a and 2b show the effect of drying and heating on the absorption spectra of optically resonant particles P, in this case in the form of gold nanorods, for two respective experiments.

In FIG. 2(a), 10 microliters of 0.1 g/L gold nanorod solution is deposited onto a flat surface, allowed to dry, and then heated to using 3.5 W/cm$^2$, 808 nm laser illumination. As shown in the depicted plot, the plasmon spectra is observed to decay due to agglomeration of the particles, also shown in a SEM image.

In FIG. 2(b), the same solution was deposited onto and dispersed into a powder G, according to the method of the first aspect of the invention, and illuminated under the same conditions, and as shown in the depicted plot, no decay of the plasmon peak is observed and in fact the peaks are blueshifted, demonstrating that there is no significant agglomeration and no self-sintering of the optically resonant particles and at the same time the powder material is sintered.

FIG. 3 shows the heating over time, for the same conditions as in FIG. 2, i.e. from 10 microliters of 0.1 g/L gold nanorod solution in powder (top graph) and in bulk, i.e. on flat surface (bottom graph), under 3.5 W/cm$^2$, 808 nm laser illumination, clearly showing the benefits regarding heating capacity of the method of the first aspect of the invention.

Figure 4:
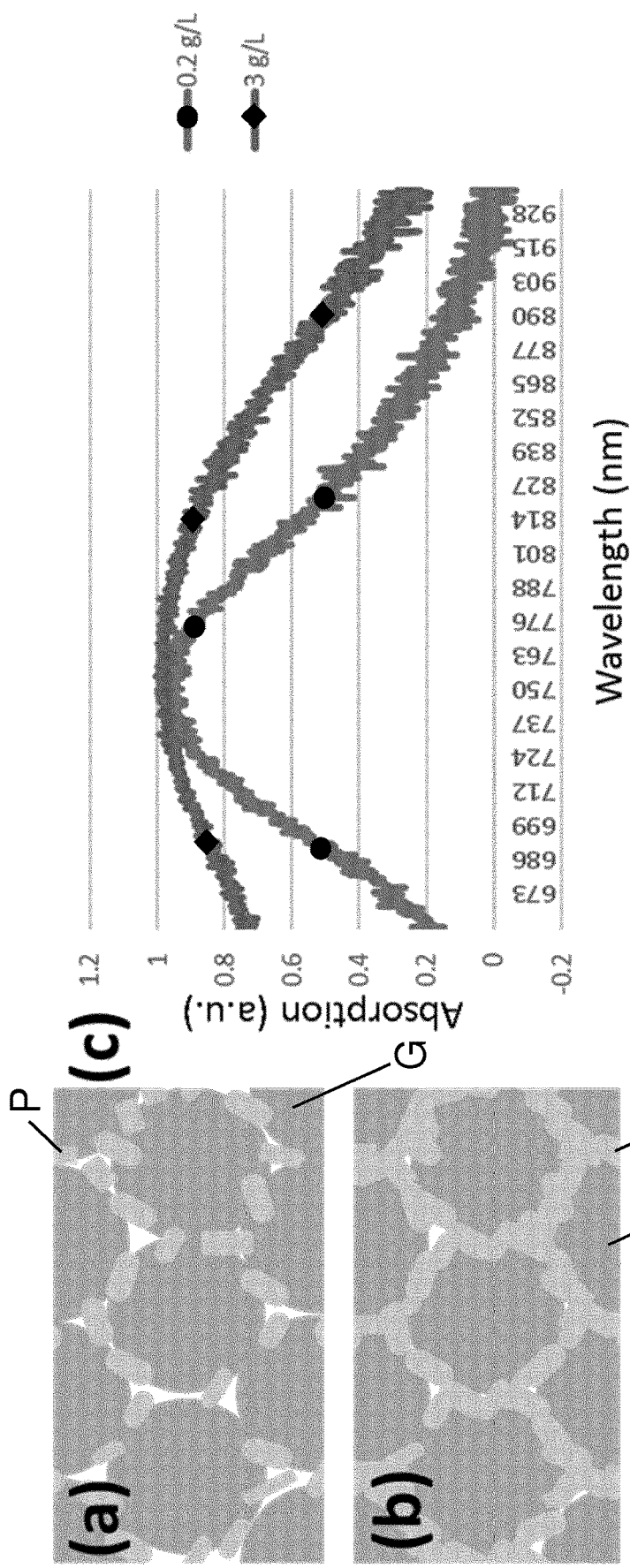
FIG. 4 illustrates the effect of concentration on the dispersion of optically resonant particles in a powder material; (a) shows low concentration, (b) shows high concentration. In (c) the absorption spectra for two concentrations of optically resonant particles, 0.2 and 3 g/L, are shown.

The effect of concentration on the dispersion of optically resonant particles P, particularly Au MNP (metal nanoparticles), in the powder G is graphically illustrated in FIG. 4.

Particularly, FIG. 4(a) shows a low concentration (0.2 g/L), while FIG. 4(b) shows a high concentration (3 g/L).

The absorption spectra plot of FIG. 4(c) demonstrates the plasmon absorption peak of some Au metal nanoparticles P deposited onto a polymer powder G in the above mentioned two concentrations, 0.2 g/L and 3 g/L, and irradiated with 2 W/cm$^2$ of a 808 nm laser for 60 s. It can be seen that the peak is redshifted and significantly broadened for the larger concentration, which is due to the agglomeration and self-sintering of the MNP's, thus concentration conditions must be chosen carefully to avoid this.

Figure 5:
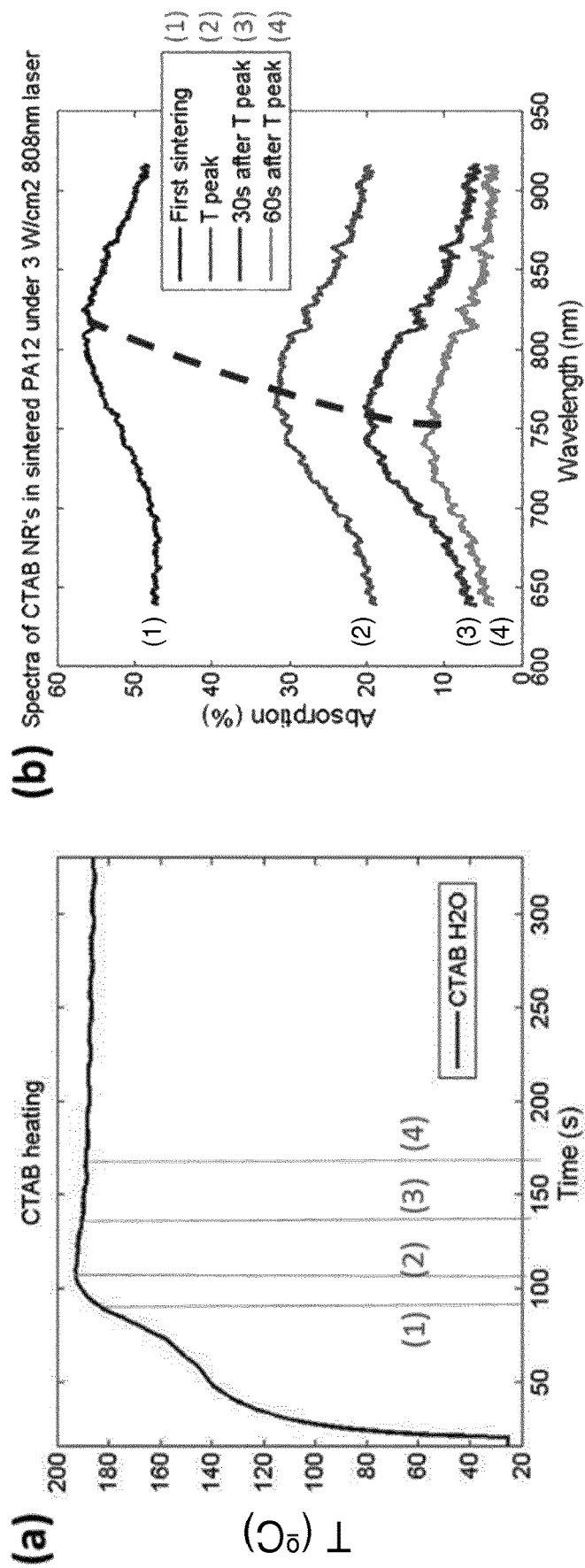
FIG. 5 shows, by means of two graphs, experimental results of the application of the method of the first aspect of the present invention, particularly graph (a) shows Max. temperature vs. time for heating of a polymer powder coated using 10 microliters of 0.1 g/L Au nanorods in H$_2$O with a CTAB (cetyltrimethyl ammonium bromide) coating under illumination from a 808 nm laser source, and graph (b) shows the absorption spectra for the nanorods in the sintered material for different sintering times.

In the plot of FIG. 5(a), graphically representing some experiments carried out according to the present invention, it can be observed that the heating of a polymer powder by gold nanorods dispersed in a 0.1 g/L solution in H$_2$O with a CTAB (cetyltrimethyl ammonium bromide) anti-agglomeration coating under illumination from an 808 nm laser, peaks at a given temperature. The temperature then decreases slowly. The maximum temperatures and temperature decay rate have also been shown to depend upon the choice of anti-agglomeration coating. A blueshift of the peak with sintering time has also been observed (for nanorods) and is shown in FIG. 5(b). This blueshift is indicative that the nanorods are actually reforming into a more spheroidal shape, which is more energetically favourable as it reduces surface energy. This shifts the resonance of the nanorods away from the laser wavelength and thus reduces the heating. All this indicates that at the peak temperature, the anti-agglomeration layer surrounding the nanorods is burned off, meaning that the conditions are ideal for sintering of the nanorods to each other. However, instead of seeing the significant peak broadening which indicates agglomeration and self-sintering of MNP's, as shown in FIG. 4, a blueshift is seen. Thus it can be shown that under these conditions, whilst the temperatures are sufficient, due to the choice of solution, surface chemistry and concentration of the nanorods, no significant self-sintering occurs.

Figure 6:
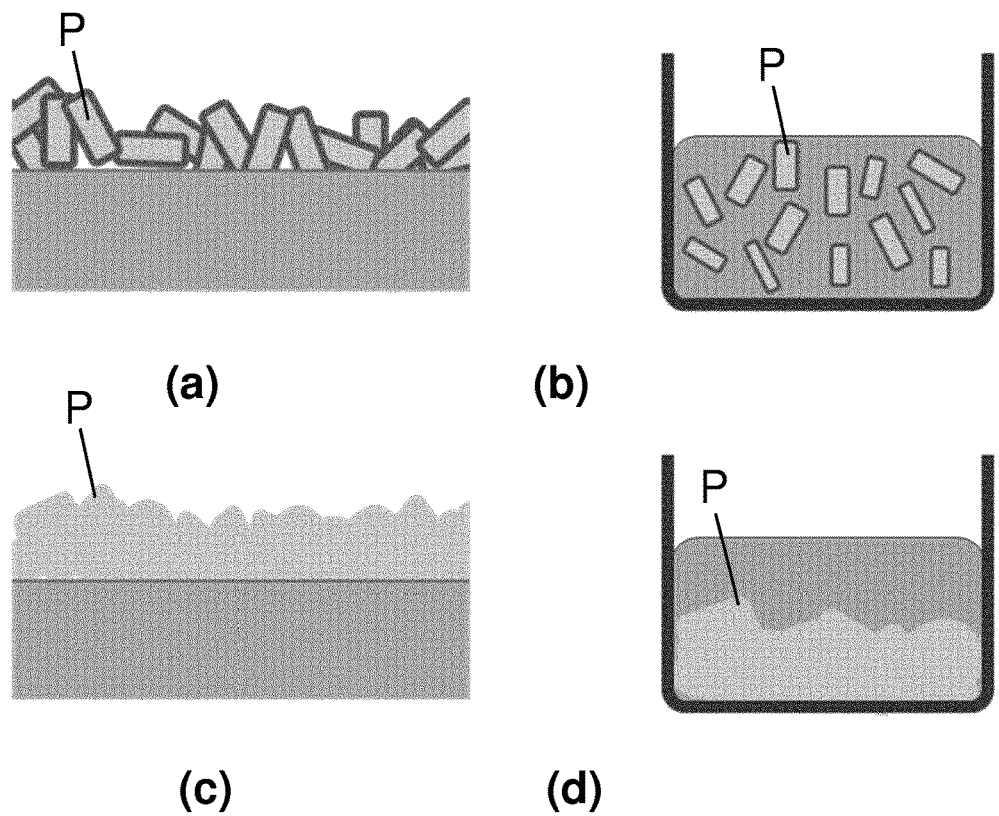
FIG. 6 schematically illustrates the effect of the anti-agglomeration coating for metal nanoparticles on a substrate (view (a) with anti-agglomeration coating according to the present invention, and view (c) with no anti-agglomeration coating) and in solution (view (b) with anti-agglomeration coating according to the present invention, and view (d) with no anti-agglomeration coating).

FIG. 6 schematically illustrates the effect of the anti-agglomeration coating for metal nanoparticles P on a substrate, views (a) and (c), and in solution, views (b) and (d).

As clearly shown in views (a) and (b), for which the metal nanoparticles P are coated by an anti-agglomeration coating (defined according to the present invention, for any of the embodiments described above) a better dispersion thereof is produced and the risk of agglomeration and self-sintering is highly reduced.

Figure 7:
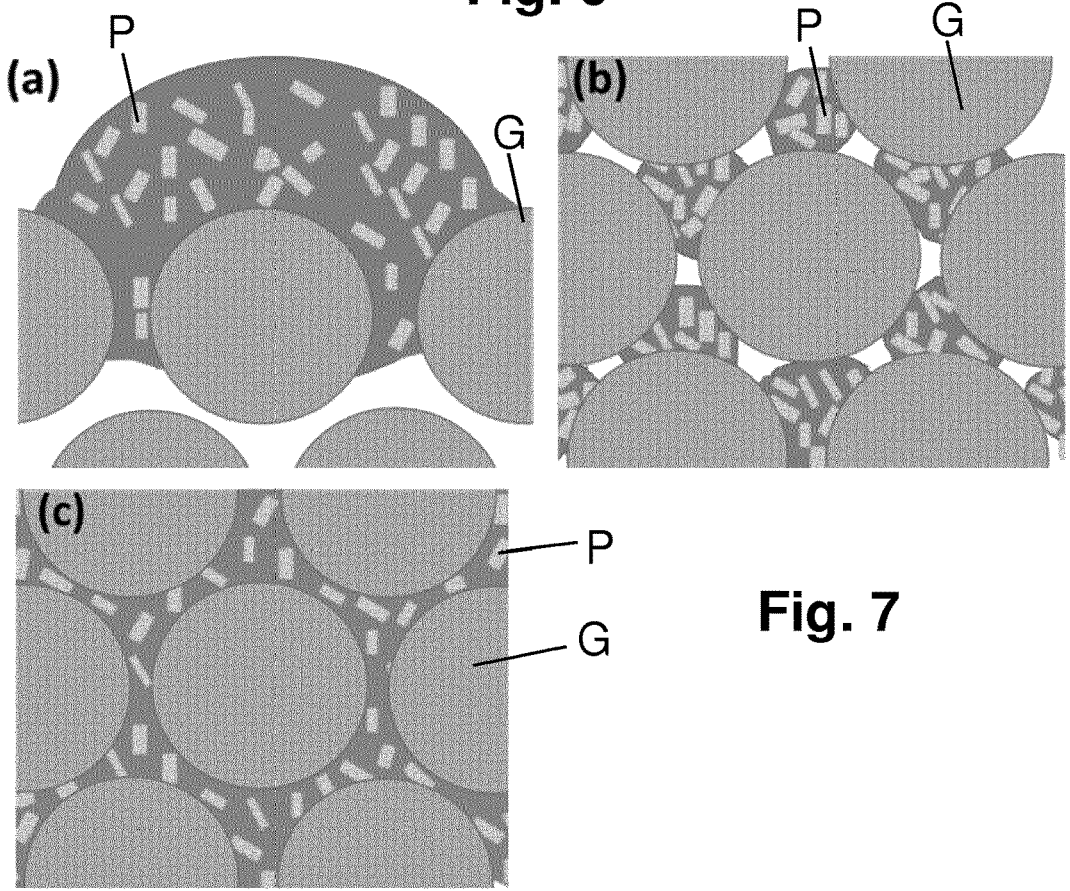
FIG. 7 schematically shows different examples of different wetting ability of liquids in the powder, for different embodiments of the method of the first aspect of the invention, for the following three cases: (a) extremely poor wetting, (b) less poor wetting, the liquid infiltrates the powder, and (c) good, i.e. high, wetting.

FIG. 7 schematically shows some embodiments of the method of the first aspect of the invention, differing from each other in that they are associated to different wetting abilities of the liquids into which the optically resonant particles P are suspended and dispersed.

Specifically, view (a) represents an extremely poor wetting, the liquid barely penetrates the powder G and resides on top of the powder bed; view (b) represents a less poor wetting, the liquid infiltrates the powder G but is not able to penetrate small cracks; and view (c) represents a good/high wetting, the liquid penetrates the powder G entirely, filling all the cracks, i.e. the gaps between the powder grains G. Cases (a) and (b) could lead to poor dispersion of the particles P, and could lead to potential agglomeration or self-sintering of the particles P under some conditions, but could also be a useful method to control where the particles P are deposited for some applications. Said potential agglomeration and self-sintering is avoided according to the method of the present invention, by controlling other factors, such as the composition of the anti-agglomeration coating, etc.

Figure 8:
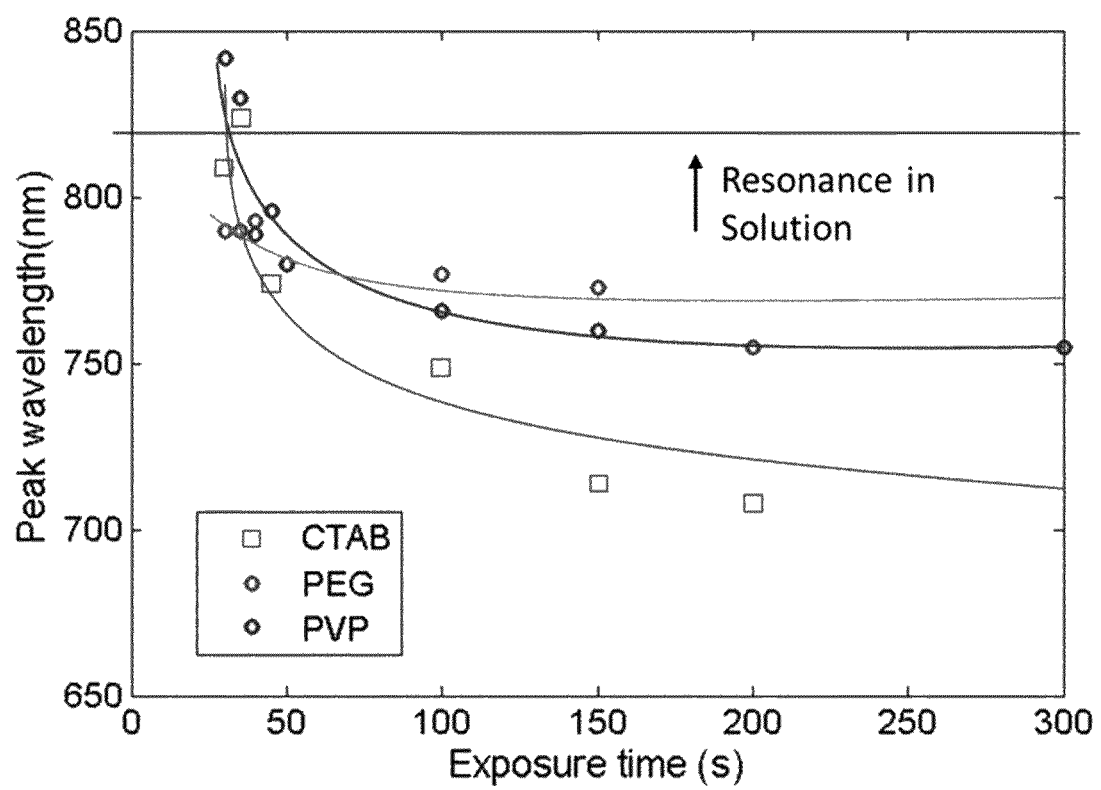
FIG. 8 is a plot showing the effect of illumination by a laser (leading to sample heating to around 200° C.) on the plasmon resonance wavelength of identical nanoparticles with different coatings, corresponding to different embodiments of the method of the first aspect of the invention.

The importance of choice of the anti-agglomeration coating for thermal stability, according to the present invention, is graphically illustrated in FIG. 8.

Experiments with different anti-agglomeration coatings have been performed for obtaining the graphs of FIG. 8, particularly CTAB, PEG, and PVP.

Specifically, the plot of FIG. 8 shows the effect of illumination by a laser (leading to sample heating to around 200° C.) on the plasmon resonance wavelength of identical optically resonant particles P with different coatings. It can be clearly seen that all geometries redshift on illumination, and that for the CTAB coating especially the peak is seen to shift over 200 nm during an illumination/heating time of under 5 minutes. The shift is caused by the particles P changing shape to minimise surface energy, a change that the anti-agglomeration coatings of the particles P generally restricts at lower temperatures.

This illustrates another key aspect of the anti-aggregation coatings, as well as stopping the particles P aggregating together they can provide shape stability for particles P of a non-spherical geometry, which can be vital to maintaining the spectral properties requested according to the present invention.

Therefore, for said embodiments, it will be advantageous to use anti-agglomeration coatings with a high-temperature stability, such as silica, although if the particle P is engineered so that its resonance decays but then stabilises outside the visible spectral range then this would be acceptable, although this could result in loss of heating efficiency. Alternately, one could imagine situations where it might be desirable to deform the particles P on heating, and so the anti-agglomeration coatings might be designed to allow for this.

Some experiments carried out according to the method of the first aspect of the present invention are described below, as possible examples, particularly describing possible anti-agglomeration coatings for the optically resonant particles P.

Said examples share the common goal of achieving a good dispersion for a suspension of nanoparticles P, particularly gold nanorods, in a plastic (or polymer) powder P or in a meltable polymer surface.

To achieve that common goal, the nanoparticles should be perfectly dispersed in a solvent able to wet adequately the polymer powder or the polymer surface, or even dissolve it partially or completely depending on the application.

The description of the metallic nanoparticles coating should be then preferentially oriented to those allowing the dispersion of the particles in different organic solvents having different polarities.

The following examples are grouped by different groups.
Group 1: Surface Active Agents (Preferentially Cationic Surfactants, CTAB):

In this case, the surfactant allows the dispersion of metallic nanoparticles in mixtures alcohol:water and improves the wettability of the hydrophobic polymer surface.

As an example the gold nanorods can be used as they are obtained from the synthesis (in Example 1 below), just adjusting the concentration of nanoparticles and CTAB to the desired values.

Example 1: Synthesis of Gold Nanorods

Nanorods presenting LSP resonance maxima between 700-900 nm can be obtained by a 2-step, seed mediated process, by varying the silver nitrate ($AgNO_3$)/ascorbic acid/seed ratios.
Preparation of the Seed:

Colloidal gold seeds were first prepared by mixing aqueous solutions of hexadecylcetyltrimethylammonium bromide (CTAS, 0.2 M, 5 mL) and hydrogen tetrachloroaurate (III) hydrate (0.5 mM, 5 mL) both kept at 27° C. A freshly prepared aqueous solution of sodium borohydride ($NaSH_4$, 0.01 M, 0.6 mL) was then added, previously cooled to 4° C., under vigorous stirring for 2 minutes. At this point the seed was allowed to settle for 2 hrs at 30° C. to allow remaining $NaSH_4$ to evolve. This yielded a gold nanoparticle suspension of sizes between 1-2 nm, which were used as seed for the preparation of nanorods. This solution will be further referred as Seed Suspension.
Nanorod Growth:

The "growth solution" was now prepared and consisted of CTAB (0.2 M, 20 mL), to which varying amounts of silver nitrate stock (4 mM) was added depending on desired nanorod aspect ratio and allowed to mix under mild stirring. Hydrogen tetrachloroaurate(III) hydrate (1 mM, 20 mL) was added and gave rise to a yellow/brown solution. Once ascorbic acid (79 mM, 0.29 mL) was added the yellow/brownish solution, the mixture should turn colourless. Next, 72 µL of aged Seed Suspension was added to the growth solution, mixed briefly and left undisturbed for 8 hrs at 30° C. to prevent CTAB crystallization. Initial colour change of the mixture should be noted after ca. 10 min. This procedure yielded a nanorod suspension presenting an LSP resonance maximum at around 820 nm (±20 nm) and a maximum absorption of 1.6 AU.
Group 2: Amphiphilic Polymers (Preferentially Cationic Polymers as PVP):

Cationic polymers are known to interact with metallic surfaces via electrostatic interactions. Covering gold nanorods with polyvinylpyrrolidone (PVP) protect the nanoparticles and improve its dispersion in alcohols. This can be done for example as described below for Example 2.

Example 2: Covering Gold Nanorods with PVP and Suspending in Ethanol

A suspension of gold nanorods as obtained in Example 1 is centrifuged at 10000 rpm 30 minutes, 90% of the supernatant is eliminated and the cake is re-suspended in water to obtain a CTAB concentration of 10 mM.

The suspension is added of PVP Mw: 10 kD (to 1 mg/mL), sonicated in an US bath for 15 minutes at 45° C. and left 12 hours at 30° C.

The as prepared PVP capped nanorods suspension is washed 2 times by centrifugation eliminating the supernatant and re-suspending in pure water and the 2 more times re-suspending in ethanol.
Group 3: Amphiphilic Moieties (Grafted to the Metallic Surface Via —SH Bonds, Preferentially PEG Molecules):

Amphiphilic molecules can be attached to the metallic surface via thiol (R-SH) complexation: The ability of the metallic nanoparticles to be dispersed in solvents will depend on the moiety R—. For example polyethylene glycol moieties (PEG) allows to disperse gold nanorods in a large variety of solvent polarities ranging from alcohols to ketones and even solvents moderately non-polar as methylene chloride.

Example 3: Covering Gold Nanorods with Thiol-PEG Molecules

A suspension of gold nanorods as obtained in Example 1 is centrifuged at 10000 rpm 30 minutes, 90% of the supernatant is eliminated and the cake is re-suspended in water to obtain a CTAB concentration of 10 mM.

The suspension of nanorods is added of HS-PEG-O-Me (Mw: 2000 D) at 1 mgr/mL, sonicated in an US bath for 15 minutes at 45° C. and left 12 hours at 30° C.

The as prepared PEG capped nanorods suspension is washed 2 times by centrifugation eliminating the supernatant and re-suspending in pure water and the 2 more times re-suspending in ethanol.

Once the ethanol suspension of PGE-nanorods is prepared they can be also re-suspended in other solvents as ketones.
Group 4: Hydrophobic Moieties (Grafted to the Metallic Surface Via —SH Bonds, Preferentially Aliphatic Alkyl Chains):

Much more hydrophobic moieties as aliphatic Alkyl chains can be attached to the metallic surfaces also via thiol (Alkyl-SH) bonding. The so capped nanoparticles can be the dispersed in highly hydrophobic solvents as toluene, ethers and even benzene or petroleum ether.

Example 4: Covering Gold Nanorods with Thiol-Alkyl Molecules

A suspension of gold nanorods as obtained in Example 1 is centrifuged at 10000 rpm 30 minutes, 90% of the supernatant is eliminated and the nanorods suspension is kept 10 times concentrated.

The suspension of nanorods 4 mL is put in contact with 4 mL of pure dodecanethiol (DDT) in a two phases system. After addition of acetone (approx. 4 mL) the nanorods starts being extracted to the DDT phase and the CTAB is exchanged by DDT molecules.

Once the aqueous CTAB phase becomes clear the DDT phase is recovered, diluted with toluene and centrifuged. The DDT capped nanorods are washed several times by centrifugation and re-dispersion in pure toluene to eliminate the excess of DDT.
Group 5: Silica Coatings (Mesoporous or not):

In that case, a very stable covering of the nanoparticles surface is obtained polymerizing silica at the surface, which is catalysed by the presence of CTAB.

This covering allows dispersing the nanorods in alcohols and silane compatible solvents.

Example 5: Covering Gold Nanorods with a Silica Shell

A suspension of gold nanorods as obtained in example 1 is centrifuged at 10000 rpm 30 minutes, 90% of the supernatant is eliminated and the cake is re-suspended in water to obtain a CTAB concentration of 10 mM. This operation is repeated to decrease the CTAB concentration to 1 mM.

The suspension of Nanorods is the added of 0.1 M NaOH to adjust the pH around 11.

The resulting suspension of nanorods (10 mL) is then treated with 30 μL of a 20% solution of TEOS (tetraethyl orthosilicate) in methanol.

This operation is repeated three times with a 30 minutes interval. After the third addition of TEOS the suspension is kept stirring 24 hours at room temperature.

The silica-covered nanorods are purified by centrifugation using repeated washing with pure water. They can also be re-suspended in ethanol.

Four further experiments were carried out by the present inventors to implement different embodiments of the method of the first aspect of the present invention, and are described below named as Examples A, B, C and D.

Example A—Very Basic Powder Sintering with Gold

The powder bed is a flat surface of PA12, created by spreading the surface of the powder with a doctoring blade to ensure an even surface. The density of the powder bed was found to be 0.46 g/cm3, which given the density of PA12 itself gives a packing density (volume of powder/total volume) of 0.46. A 5 microliter drop of optically resonant nanoparticles (particularly gold nanorods (GNR)) in ethanol spreads to a volume around 3.5 mm in diameter and 1 mm deep. This means that with the liquid and the powder, the mass fraction of the GNR's (for a concentration of 0.2 g/L) is around $1\times10^{-4}$, or 0.01%. Once the liquid has evaporated the mass fraction is $2\times10^{-4}$, or 0.02%.

Note that the penetration of the nanoparticles solution is highly dependent on the choice of solution and any other additives present, for example, a 70% $H_2O$, 30% ethanol solution produces a much wider spot, as does an aqueous solution containing CTAB.

For a 5 microliter drop of 0.2 g/L PEG coated GNR's in ethanol, under 3 $W/cm^2$ illumination (unfocussed, over a 1 $cm^2$ area) for 45 s from room temperature, a sintered disk of 3 mm in diameter and 0.5 mm thickness is produced. However this is highly dependent on the concentration, laser power, laser spot size, solution, illumination time and initial powder bed temperature, and much larger and smaller sintered spots are possible with this (comparatively large) volume of liquid.

Sintered spots can be deposited and/or illuminated strategically to form a defined pattern, which could be sintered by multiple illuminations by the laser or simultaneously using an LED array. The doctoring blade or a roller is then used to add another layer of powder (with thickness in the 0.1-1 mm range depending on the given experiment) and the process repeated. By repeating these steps it is possible to create a well-defined 3D object via a layer-by-layer approach.

In a variation of this example, a coloured dye is added in with the solution, or several differently coloured dyes to different solutions, which are then dropped selectively to form a coloured pattern. The layer is then sintered. Repeating the process layer-by-layer forms a fully coloured 3D object.

In another variation of this example, drops of solution containing optically resonant particles and/or dyes or other materials could be applied using an inkjet printhead or several inkjet printheads to achieve high-resolution and have the potential for colour mixing.

Example B—Basic Sintering with ITO

Tin doped indium oxide nanoparticles (ITO) were synthesized similarly to a previously published method (J Am Chem Soc. 136(19), 7110-71166) as follows: inside a 200 ml three neck glass flask which was attached to a Schlenk line glass apparatus for controlling the atmosphere inside the flask, and was placed on a hot-plate for controlling the temperature of the flask, the following chemicals were added: 0.314 g indium acetate, 0.048 g tin ethylhexanoate, 10 ml octyl ether, 2.674 g oleylamine, 0.52 g octanoic acid. The content of the flask was constantly and rigorously stirred with the aid of a magnetic stirring plate located beneath the flask and a magnetic stirring bar located inside the flask. Then, under a low-pressure atmosphere (pressure less than 0.9 mbar) the above mixture was heated to 60° C. for 30 minutes, and was subsequently heated to 100° C. for 30 minutes. Then, under an argon atmosphere the temperature of the solution was further heated to 150° C. for 30 minutes, at which point it becomes clear and transparent. Then, under argon atmosphere the temperature of the flask was raised within 10 minutes to 280° C. during which time the colour of the flask initially turns yellow and then dark blue/green, signifying the formation of colloidal ITO nanoparticles 3-10 nm in diameter. The temperature of the flask was maintained to 280° C. for 2 hours, after which time period the flask was cooled down to room temperature.

Then, the content of the flask was transferred to inside two centrifuge glass tubes and 6 ml of ethanol was further added. Then, the tubes were centrifuged for 5 minutes at 3500 rounds per minute using a centrifuge. After this process, the nanoparticles had precipitated at the bottom of the tubes and the supernatant solution on top was removed. The nanoparticle precipitate was re-dissolved in 2 ml of toluene, and then 6 ml of ethanol were added and the aforementioned centrifugation process was repeated. The final nanoparticle precipitate was re-dissolved in toluene forming a stable light blue/green colloidal solution. The weight per volume concentration of the nanoparticles in the solution can be adjusted by controlling the volume of the added toluene, and in a specific example this concentration was adjusted to 10 mg ITO nanoparticles per 1 ml of toluene. The ITO nanoparticles are covered with molecules of octanoic acid and oleylamine which are located on the surface of the nanoparticles and prevent the agglomeration and necking of the nanoparticles. The nominal length of the oleylamine molecule is approximately 2 nm, and the nominal length of the octanoic acid molecules is approximately 1 nm. Depending on the relative concentration of the aforementioned molecules on the surface of the ITO NPS and the spatial configuration and mechanism of attachment of the molecules on the surface on the surface of the nanoparticles, the inter-nanoparticle distance of the ITO nanoparticles may vary, but in an example it is maintained to above 1 nm. In this example, the presence of these oleylamine and octanoic acid molecules, serves the following purposes: they provide colloidal stability of the ITO nanoparticles in the toluene solvent, they stabilized chemically the surface of the ITO nanoparticles, and they sterically prohibit agglomeration and necking of the ITO nanoparticles. For the rest of this example, the combination of the ITO nanoparticles and the aforementioned ligands that coat the surface of the nanoparticles, will be referred to as ITO nanoparticles.

The nanoparticles had an optical resonance absorption peak at 1700 nm optical wavelength.

The powder bed is a flat surface, created by spreading the surface of the powder (which is PA12) with a doctoring blade to ensure an even surface. The density of the powder bed was found to be 0.46 g/cm3, which given the density of PA12 itself gives a packing density (volume of powder/total volume) of 0.46.

A 10 microliter drop of the ITO nanoparticles (NP's) in toluene (or octane) spreads to a volume around 6 mm in diameter and 1 mm deep, and was prepared as described in the above paragraphs and dropped on the powder bed. This means that with the liquid and the powder, the mass fraction of the ITO NP's (for a concentration of 10 g/L) is around 6×10-3, or 0.6%. Once the liquid has evaporated the mass fraction is $1 \times 10^{-2}$, or 1%. It must be emphasized that once the liquid has been evaporated, the ITO nanoparticles are still covered with the aforementioned organic ligands (e.g. oleylamine, octanoic acid molecules) which still serve their aforementioned functionalities such as preventing the necking of the ITO nanoparticles and its detrimental effects on the optical properties of the ITO nanoparticles.

The powder mixed with the ITO NP's was illuminated with a 37 W blackbody source with a temperature of 1385° C. and an output window area of 5 cm2, at a distance of 10 mm for 120 s where the powder has been preheated to 150° C. by a hotplate. A spot of 5 mm in diameter and 1 mm thickness is produced.

Spots can be deposited and/or illuminated strategically to form a defined pattern, which could be sintered by multiple illuminations larger, more powerful IR lamp. The doctoring blade or a roller is then used to add another layer of powder (with thickness in the 0.1-1 mm range depending on the given experiment) and the process repeated. By repeating these steps it is possible to create a well-defined 3D object via a layer-by-layer approach.

Example C, Selective Laser Sintering with Au NR's 8 g of PA12 powder was mixed with 10 ml of 0.2 g/L Au NR's (nanorods) coated in PEG and suspended in ethanol. The mixture was centrifuged at 6000 rpm for 3 minutes, the decanted and dried slowly at 50° C. This produces a mixed powder of Au NR's and PA12 with a mass fraction of NR's to PA12 powder of $2.5 \times 10^4$ or 0.025%.

The powder was then smoothed onto a flat surface for laser sintering. The mixed powder was heated to a surface temperature of 150° C. using a hotplate and an IR lamp, and was then illuminated with a 820 nm laser using a scanning speed of 2.5 mm/s with a spot diameter of 30 microns and a power incident at the sample of 100 mW. The spot was moved across the surface in a defined pattern by scanning mirrors and the laser switched on and off, thus selectively sintering the powder.

After the layer was complete, another layer of powder was applied, powder (with thickness in the 0.1-1 mm range depending on the given experiment) preheated and then sintered, thus building a 3D object.

The finished sintered product was found to be a white polymer, thus demonstrating that SLS (Selective Laser Sintering) with powders mixed with these nanoparticle solutions can produce white finished products utilising low power lasers without the need to blacken the powder to enhance absorption.

Example D—Colourful Inkjet Printing of 2D and 3D Objects

Au NR's coated in silica were mixed with several commercial inks for inkjet printers (yellow, red, blue and black); 10 ml of ink was mixed with 0.02 g of NR's. After mixing, the ink+NR solutions were sonicated for 10 mins to ensure a good mixture and dispersion and were then applied selectively to a PA12 powder bed via an Epson inkjet printhead. The resolution was 600 dpi.

The powder bed was heated to 170° C. and then illuminated with a 200 W LED array with a peak wavelength of 850 nm. This heated the NR's enough to sinter the PA12 powder in the area with ink deposited on it within 1 s. The sintered object was mechanically stable and showed bright colours.

For some shapes, another layer of PA12 powder was added above the already sintered layer, and the process repeated to form a second sintered layer above the first. This was repeated several times to form a colourful 3D printed object.

A person skilled in the art could introduce changes and modifications in the embodiments described without departing from the scope of the invention as it is defined in the attached claims. For example, a method or system as the ones of the present invention which, instead of light, comprises the use of another types of radiation (such as ultrasound, thermal, electric, electrostatic, magnetic, or ionizing radiation) to expose the resonant particles, which are well known in the art for exciting such kind of particles causing them to resonate, is to be considered equivalent to the one of the present invention.

The invention claimed is:

1. A method for producing a three-dimensional object, comprising:
   providing a powder material;
   providing a radiation absorbent material at least on a region to be sintered of said powder material, wherein the method comprises providing, as said radiation absorbent material, optically resonant particles; and
   sintering said region to be sintered of the powder material, by exposing said radiation absorbent material to radiation that causes the optically resonant particles to optically resonate to heat up and transfer heat to the powder material, wherein said radiation is light;
   wherein the method comprises providing said optically resonant particles according to the following parameters: distribution and proportion of the optically resonant particles with respect to the powder material included in said region to be sintered, wherein the method comprises selecting said parameters:
   to disperse the optically resonant particles within the powder material included in said region, and
   to avoid substantial agglomeration and substantial self-sintering of the optically resonant particles, even during sintering of the powder material;

wherein said substantial agglomeration and substantial self-sintering, respectively, refer to an agglomeration and self-sintering which causes a change in the absorption spectra of the optically resonant particles in the form of at least one of:
- at least one shift in one or more optical resonance peaks above or equal to five times the full-width at half maximum (FWHM); and
- at least a broadening of one or more optical resonance peaks above or equal to five times the FWHM;

wherein the method further comprises providing an anti-agglomeration coating on said optically resonant particles, wherein said anti-agglomeration coating is configured to cooperate in said avoiding of substantial agglomeration and substantial self-sintering of the optically resonant particles, before being provided on said region to be sintered, while being provided on the region to be sintered, and once already provided on the region to be sintered, at least by tailoring the surface chemistry of the optically resonant particles.

2. The method of claim 1, comprising producing a three-dimensional object using a layer-by-layer deposition process, by applying at least a further powder material over the already sintered powder material, and then sintering a region of said further powder material also by providing thereon optically resonant particles according to said selected parameters, and exposing to light radiation the optically resonant particles provided on the further powder layer.

3. The method of claim 1, wherein said optically resonant particles include at least one of plasmonic resonant particles, Mie resonant particles, or a combination thereof.

4. The method of claim 1, wherein said optically resonant particles have an average cross-sectional length that is from 1 nm up to 5 µm.

5. The method of claim 1, comprising selecting said anti-agglomeration coating to maximize thermal shape stability.

6. The method of claim 1, comprising selecting said anti-agglomeration coating to maximize thermal chemical stability.

7. The method of claim 1, wherein said step of providing the optically resonant particles at least on a region to be sintered of the powder material comprises providing them in a dry form.

8. The method of claim 1, wherein said step of providing the optically resonant particles at least on a region to be sintered of the powder material comprises providing them in a liquid or solution, wherein the liquid or solution, and the concentration of optically resonant particles are chosen to cooperate in said avoiding of substantial agglomeration and substantial self-sintering of the optically resonant particles.

9. The method of claim 1, wherein said step of providing the optically resonant particles at least on a region of the powder material is performed by selectively depositing the optically resonant particles on one or more regions to be sintered of the powder material and said sintering step is performed by exposing to light the powder material and the optically resonant particles deposited on said one or more regions to be sintered thereof.

10. The method of claim 1, wherein said step of providing the optically resonant particles at least on a region to be sintered of the powder material is performed non-selectively on the whole powder material by:
- mixing the optically resonant particles with all of the already provided powder material; or
- mixing the optically resonant particles with a non-solid or dissolved material, solidifying or drying the mixture and then turn the solidified/dried mixture into a powder form to produce mixture powder material including both the optically resonant particles and the powder material to be sintered; or
- depositing the optically resonant particles on all of the already provided powder material;
- and further wherein said sintering step is performed by selectively exposing to light the powder material and the optically resonant particles provided on the one or more regions to be sintered thereof.

11. The method of claim 1, wherein said optically resonant particles are made of at least one of a metal material, a semiconductor material, an oxide semiconductor material, and a dielectric material, or a combination thereof.

12. The method of claim 8, comprising selecting at least one of said liquid or solution and additives added thereto according to its wetting abilities on the powder material, to control both said dispersion of the optically resonant particles within the powder material and said avoiding of substantial agglomeration and substantial self-sintering of the optically resonant particles.

13. The method of claim 1, wherein in order to produce a three-dimensional object with a colour which is substantially the same as the colour of the powder material or of an added colour pigment, the method comprises:
- tuning the optically resonant particles so that their principal resonance is outside the visible spectrum, wherein said radiation to which the radiation absorbent material is exposed is light outside the visible spectrum; or
- tuning the optically resonant particles so that their principal resonance is within the visible spectrum and associated to a wavelength which matches or overlaps an absorption wavelength of the powder material or of an added colour pigment, wherein said radiation to which the radiation absorbent material is exposed is light which includes said wavelength.

14. The method of claim 1, wherein in order to produce a three-dimensional object with a colour which is different from the colour of the powder material or of an added colour pigment, the method comprises tuning the optically resonant particles so that their resonance is within the visible spectrum and associated to a wavelength which does not either match nor overlap an absorption wavelength of the powder material or of an added colour pigment, wherein said radiation to which the radiation absorbent material is exposed is light which includes said wavelength.

15. The method of claim 1, comprising tuning the optically resonant particles so that their strongest resonant peak and/or the greatest portion of their absorption spectra is in the 180 nm to 5000 nm spectral range, and wherein said radiation to which the radiation absorbent material is exposed is light at least at a wavelength included in said spectral ranges.

16. A system for producing a three-dimensional object, comprising:
- at least one supplier device configured and arranged for providing:
  - a powder material; and
  - a radiation absorbent material at least on a region to be sintered of said powder material, wherein said radiation absorbent material is constituted by optically resonant particles; and
- a controllable radiation source configured and arranged for exposing said radiation absorbent material to radiation that causes the optically resonant particles to optically resonate to heat up and transfer heat to the powder material, wherein said radiation is light, in order to sinter said region to be sintered of the powder material; wherein:

said at least one supplier device is adapted to provide said optically resonant particles according to the following parameters: distribution and proportion of the optically resonant particles, with respect to the powder material included in said region to be sintered, wherein said parameters are selected:

to disperse the optically resonant particles within the powder material included in said region, and to avoid substantial agglomeration and substantial self-sintering of the optically resonant particles, even during sintering of the powder material, wherein said substantial agglomeration and substantial self-sintering refers to an agglomeration and self-sintering which causes a change in the absorption spectra of the optically resonant particles in the form of at least one of:

at least one shift in one or more optical resonance peaks above or equal to five times the full-width at half maximum (FWHM); and at least a broadening of one or more optical resonance peaks above or equal to five times the FWHM;

wherein said at least one supplier device is adapted to provide said optically resonant particles with an anti-agglomeration coating thereon, wherein said anti-agglomeration coating is configured to cooperate in said avoiding of said agglomeration and self-sintering of the optically resonant particles, before being provided on said region to be sintered, while being provided on the region to be sintered, and once already provided on the region to be sintered, at least by the tailoring of the surface chemistry of the optically resonant particles.

17. The system of claim 16, wherein said at least one supplier device is a common supplier device configured and arranged to provide simultaneously both the powder material and the radiation absorbent material in the form of a mixture powder material.

18. The system of claim 16, wherein said at least one supplier device are two supplier devices, one configured and arranged for providing the powder material and another configured and arranged for providing the optical resonant particles.

19. The system of claim 18, constituting a 3D printer, wherein said supplier device configured and arranged for providing the optical resonant particles is an inkjet print head.

20. The system of claim 16, further comprising a controller including a memory, program code residing in the memory, and a processor in communication with the memory and configured to execute the program code to generate control signals to apply to at least the controllable radiation source and to the at least one supplier device, to carry out the control of the operations thereof.

* * * * *